United States Patent
Shen et al.

(10) Patent No.: US 11,388,089 B2
(45) Date of Patent: Jul. 12, 2022

(54) DOWNSTREAM PACKET SENDING AND FORWARDING METHOD AND APPARATUS

(71) Applicant: HUAWEI TECHNOLOGIES CO., LTD., Guangdong (CN)

(72) Inventors: Li Shen, Nanjing (CN); Yinliang Hu, Nanjing (CN); Peng Chen, Nanjing (CN); Duoliang Fan, Nanjing (CN); Jingmin Zhang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 63 days.

(21) Appl. No.: 16/991,775

(22) Filed: Aug. 12, 2020

(65) Prior Publication Data

US 2020/0374220 A1 Nov. 26, 2020

Related U.S. Application Data

(63) Continuation of application No. PCT/CN2019/112793, filed on Oct. 23, 2019.

(30) Foreign Application Priority Data

Nov. 5, 2018 (CN) .......................... 201811308475.1

(51) Int. Cl.
*H04L 29/12* (2006.01)
*H04L 45/00* (2022.01)
(Continued)

(52) U.S. Cl.
CPC .............. *H04L 45/34* (2013.01); *H04L 45/30* (2013.01); *H04L 47/6275* (2013.01);
(Continued)

(58) Field of Classification Search
CPC ..... H04L 45/34; H04L 45/30; H04L 47/6275; H04L 49/252; H04L 49/3027; H04L 61/6022; H04L 69/22
See application file for complete search history.

(56) References Cited

U.S. PATENT DOCUMENTS

| 7,519,059 B2 | 4/2009 | Battle et al. |
| 7,693,152 B2 | 4/2010 | Deng |

(Continued)

FOREIGN PATENT DOCUMENTS

| CN | 102255805 A | 11/2011 |
| CN | 103546380 A | 1/2014 |

(Continued)

OTHER PUBLICATIONS

Wang et al., "BIER Ethernet; draft-wang-bier-ethemet-02," Internet Engineering Task Force, IETF, Sep. 18, 2016, pp. 1-10.
(Continued)

*Primary Examiner* — Fahmida S Chowdhury
(74) *Attorney, Agent, or Firm* — Fish & Richardson P.C.

(57) ABSTRACT

This application provides a downstream packet sending method, a downstream packet forwarding method, a downstream packet sending apparatus, and a downstream packet forwarding apparatus. The downstream packet sending method in this application includes: configuring a downstream forwarding path of a downstream packet for a terminal device; generating a source MAC address based on the downstream forwarding path, where the source MAC address is used to indicate the downstream forwarding path; and sending the downstream packet to a forwarding switch, where the downstream packet includes the source MAC address. This application can reduce costs, improve efficiency, and simplify network traffic.

18 Claims, 14 Drawing Sheets

(51) Int. Cl.
    *H04L 45/30*     (2022.01)
    *H04L 47/6275*     (2022.01)
    *H04L 49/25*     (2022.01)
    *H04L 49/00*     (2022.01)
    *H04L 61/103*     (2022.01)
    *H04L 101/622*     (2022.01)
    *H04L 69/22*     (2022.01)

(52) U.S. Cl.
    CPC ........ *H04L 49/252* (2013.01); *H04L 49/3027* (2013.01); *H04L 61/103* (2013.01); *H04L 61/6022* (2013.01); *H04L 69/22* (2013.01)

(56) References Cited

U.S. PATENT DOCUMENTS

| | | | |
|---|---|---|---|
| 2009/0067324 A1* | 3/2009 | Licardie | H04L 43/0811 370/225 |
| 2016/0248668 A1* | 8/2016 | Lin | H04L 47/2475 |
| 2016/0352637 A1* | 12/2016 | Wakumoto | H04L 61/6022 |
| 2017/0126815 A1 | 5/2017 | Kim et al. | |
| 2018/0198634 A1* | 7/2018 | Lentczner | H04L 69/22 |

FOREIGN PATENT DOCUMENTS

| | | |
|---|---|---|
| CN | 104158749 A | 11/2014 |
| CN | 104394083 A | 3/2015 |
| CN | 106937408 A | 7/2017 |
| CN | 107171977 A | 9/2017 |
| CN | 107181681 A | 9/2017 |
| WO | 0008801 A2 | 2/2000 |
| WO | 2014000286 A1 | 1/2014 |
| WO | 2015113290 A1 | 8/2015 |

OTHER PUBLICATIONS

Extended European Search Report in European Application No. 19882510.1, dated Mar. 12, 2021, 10 pages.
Office Action issued in Chinese Application No. 201811308475.1 dated Sep. 14, 2020, 11 pages (With English Translation).
PCT International Search Report and Written Opinion in International Application No. PCT/CN2019/112,793, dated Jan. 15, 2020, 12 pages (With Partial English Translation).

* cited by examiner

DOWNSTREAM PACKET SENDING AND FORWARDING METHOD AND APPARATUS

CROSS-REFERENCE TO RELATED APPLICATIONS

This application is a continuation of International Application No. PCT/CN2019/112793, filed on Oct. 23, 2019, which claims priority to Chinese Patent Application No. 201811308475.1, filed on Nov. 5, 2018. The disclosures of the aforementioned applications are hereby incorporated by reference in their entireties.

TECHNICAL FIELD

This application relates to communications technologies, and in particular, to a downstream packet sending and forwarding method and apparatus.

BACKGROUND

As a scale of an enterprise network increases, more devices are connected, and richer services are provided, information communications technology (, ICT) applications increase explosively, increasing traffic in the enterprise network. In addition, increasingly high requirements are imposed on experience provided by enterprise services, requiring more real-time and more qualified service experience. These trends impose a requirement that the enterprise network be more concise and efficient.

Currently, an approach to simplifying an enterprise network is to simplify network traffic forwarding. For example, in a software-defined network (, SDN), a flow-table mode is used. To be specific, a flow table corresponding to a data flow is delivered to a switch along a route, to control a forwarding path of the data flow.

However, the SDN implements conversion from a conventional distributed forwarding architecture to a centralized forwarding architecture. As a result, large space for storing the flow stable is needed on a forwarding plane. Therefore, a degree of simplification of the network is limited.

SUMMARY

This application provides a downstream packet sending and forwarding method and apparatus, to reduce costs, improve efficiency, and simplify network traffic.

According to a first aspect, this application provides a routing information delivery method, including:
receiving an ARP request sent by a terminal device; configuring an upstream forwarding path of an upstream packet for the terminal device in response to the ARP request; generating a destination MAC address based on the upstream forwarding path, where the destination MAC address is used to indicate the upstream forwarding path; and sending an ARP response to the terminal device, where the ARP response includes the destination MAC address.

In this application, routing information is written into the destination MAC address, and the routing information is delivered by using an existing ARP, thereby reducing costs, improving efficiency, and simplifying network traffic.

In a possible implementation, before the generating a destination MAC address based on the upstream forwarding path, the method further includes: determining a priority of the terminal device; and the generating a destination MAC address based on the upstream forwarding path includes: generating the destination MAC address based on the upstream forwarding path and the priority.

In a possible implementation, after the sending an ARP response to the terminal device, the method further includes: determining, based on a network topology and network traffic, whether the upstream forwarding path of the terminal device needs to be switched; and if the upstream forwarding path of the terminal device needs to be switched, configuring a new upstream forwarding path for the terminal device based on the network topology and the network traffic, and generating a new destination MAC address based on the new upstream forwarding path.

In a possible implementation, after the sending an ARP response to the terminal device, the method further includes: determining whether the priority of the terminal device needs to be changed; and if the priority of the terminal device needs to be changed, determining a new priority of the terminal device, and generating a new destination MAC address based on the new priority.

In a possible implementation, the most significant byte in the destination MAC address is used to represent a type of the destination MAC address, the second most significant byte is used to represent the priority of the terminal device, and bytes from the least significant byte to a higher-order byte are used to respectively represent in sequence egress ports of forwarding switches on the upstream forwarding path of the upstream packet.

In a possible implementation, after the generating a new destination MAC address, the method further includes: sending a gratuitous ARP packet to the terminal device, where the gratuitous ARP packet includes the new destination MAC address.

According to a second aspect, this application provides a routing information obtaining method, including:
sending an ARP request to a core switch, where the ARP request is used to trigger the core switch to configure an upstream forwarding path of an upstream packet; generating a destination MAC address based on the upstream forwarding path, where the destination MAC address is used to indicate the upstream forwarding path; receiving an ARP response sent by the core switch, where the ARP response includes the destination MAC address; and storing the destination MAC address in a locally stored ARP table.

In this application, routing information is written into the destination MAC address, and the routing information is delivered by using an existing ARP, thereby reducing costs, improving efficiency, and simplifying network traffic.

In a possible implementation, the destination MAC address is further used to indicate a priority of a terminal device.

In a possible implementation, the most significant byte in the destination MAC address is used to represent a type of the destination MAC address, the second most significant byte is used to represent the priority of the terminal device, and bytes from the least significant byte to a higher-order byte are used to respectively represent in sequence egress ports of forwarding switches on the upstream forwarding path of the upstream packet.

In a possible implementation, after the storing the destination MAC address in a locally stored ARP table, the method further includes: receiving a gratuitous ARP packet sent by the core switch, where the gratuitous ARP packet includes a new destination MAC address, and the new destination MAC address includes a new upstream forwarding path and/or a new priority; and updating the ARP table based on the new destination MAC address.

According to a third aspect, this application provides an upstream packet sending method, including:

obtaining a destination MAC address based on a locally stored ARP table, where the destination MAC address is used to indicate an upstream forwarding path of an upstream packet; and sending the upstream packet to a forwarding switch, where the upstream packet includes the destination MAC address.

In this embodiment, a terminal device adds, to the upstream packet, the destination MAC address that indicates the upstream forwarding path, so that the forwarding switch can forward the upstream packet based on the destination MAC address, without requiring a label or storing an entry in a forwarding process, thereby reducing costs, improving efficiency, and simplifying network traffic.

In a possible implementation, the destination MAC address is further used to indicate a priority of the terminal device.

In a possible implementation, the most significant byte in the destination MAC address is used to represent a type of the destination MAC address, the second most significant byte is used to represent the priority of the terminal device, and bytes from the least significant byte to a higher-order byte are used to respectively represent in sequence egress ports of forwarding switches on the upstream forwarding path of the upstream packet.

According to a fourth aspect, this application provides an upstream packet forwarding method, including:

receiving an upstream packet sent by a terminal device, where the upstream packet includes a destination MAC address, and the destination MAC address is used to indicate an upstream forwarding path of the upstream packet; determining, based on the destination MAC address, an egress port corresponding to the upstream packet; and sending the upstream packet through the egress port.

In this embodiment, the terminal device adds, to the upstream packet, the destination MAC address that indicates the upstream forwarding path, so that a forwarding switch can forward the upstream packet based on the destination MAC address, without requiring a label or storing an entry in a forwarding process, thereby reducing costs, improving efficiency, and simplifying network traffic.

In a possible implementation, the destination MAC address is further used to indicate a priority of the terminal device; and the sending the upstream packet through the egress port includes: placing the upstream packet into a forwarding queue corresponding to the priority, and sending the upstream packet through the egress port when it comes the turn to send the upstream packet.

In a possible implementation, after the determining, based on the destination MAC address, an egress port corresponding to the upstream packet, the method further includes: setting a bit that is in the destination MAC address and that is used to represent the egress port to zero.

In a possible implementation, the determining, based on the destination MAC address, an egress port corresponding to the upstream packet includes: searching for a non-zero byte starting from the least significant byte to a higher-order byte of the destination MAC address, and using, as the egress port, an egress port indicated by a value of the first non-zero byte.

In a possible implementation, the most significant byte in the destination MAC address is used to represent a type of the destination MAC address, the second most significant byte is used to represent the priority of the terminal device, and bytes from the least significant byte to the higher-order byte are used to respectively represent in sequence egress ports of forwarding switches on the upstream forwarding path of the upstream packet.

According to a fifth aspect, this application provides a downstream packet sending method, including:

configuring a downstream forwarding path of a downstream packet for a terminal device; generating a source MAC address based on the downstream forwarding path, where the source MAC address is used to indicate the downstream forwarding path; and sending the downstream packet to a forwarding switch, where the downstream packet includes the source MAC address.

In this embodiment, a core switch adds, to the downstream packet, the source MAC address that indicates the downstream forwarding path, so that the forwarding switch can forward the downstream packet based on the source MAC address, without requiring a label or storing an entry in a forwarding process, thereby reducing costs, improving efficiency, and simplifying network traffic.

In a possible implementation, before the generating a source MAC address based on the downstream forwarding path, the method further includes: determining a priority of the terminal device; and the generating a source MAC address based on the downstream forwarding path includes: generating the source MAC address based on the downstream forwarding path and the priority.

In a possible implementation, after the sending the downstream packet to a forwarding switch, the method further includes: determining, based on a network topology and network traffic, whether the downstream forwarding path of the terminal device needs to be switched and/or whether the priority of the terminal device needs to be changed; if the downstream forwarding path of the terminal device needs to be switched and/or the priority of the terminal device needs to be changed, configuring a new downstream forwarding path and/or a new priority for the terminal device based on the network topology and the network traffic; and generating a new source MAC address based on the new downstream forwarding path and/or the new priority.

In a possible implementation, the most significant byte in the source MAC address is used to represent a type of the source MAC address, the second most significant byte is used to represent the priority of the terminal device, and bytes from the least significant byte to a higher-order byte are used to respectively represent in sequence egress ports of forwarding switches on the downstream forwarding path of the downstream packet.

According to a sixth aspect, this application provides a downstream packet forwarding method, including:

receiving a downstream packet sent by a core switch, where the downstream packet includes a source MAC address, and the source MAC address is used to indicate a downstream forwarding path of the downstream packet; determining, based on the source MAC address, an egress port corresponding to the downstream packet; and sending the downstream packet through the egress port.

In this embodiment, the core switch adds, to the downstream packet, the source MAC address that indicates the downstream forwarding path, so that a forwarding switch can forward the downstream packet based on the source MAC address, without requiring a label or storing an entry in a forwarding process, thereby reducing costs, improving efficiency, and simplifying network traffic.

In a possible implementation, the source MAC address is further used to indicate a priority of a terminal device; and the sending the downstream packet through the egress port includes: placing the downstream packet into a forwarding queue corresponding to the priority, and sending the downstream packet through the egress port when it comes the turn to send the downstream packet.

In a possible implementation, after the determining, based on the source MAC address, an egress port corresponding to the downstream packet, the method further includes: setting a bit that is in the source MAC address and that is used to represent the egress port to zero.

In a possible implementation, the determining, based on the source MAC address, an egress port corresponding to the downstream packet includes: searching for a non-zero byte starting from the least significant byte to a higher-order byte of the source MAC address, and using, as the egress port, an egress port indicated by a value of the first non-zero byte.

In a possible implementation, the most significant byte in the source MAC address is used to represent a type of the source MAC address, the second most significant byte is used to represent the priority of the terminal device, and bytes from the least significant byte to the higher-order byte are used to respectively represent in sequence egress ports of forwarding switches on the downstream forwarding path of the downstream packet.

According to a seventh aspect, this application provides a routing information delivery apparatus, including a receiving module, a configuration module, a generation module, and a sending module, where the apparatus is configured to implement the method according to any one of the first aspect or the implementations of the first aspect.

According to an eighth aspect, this application provides a routing information obtaining apparatus, including a sending module, a receiving module, and a storage module, where the apparatus is configured to implement the method according to any one of the second aspect or the implementations of the second aspect.

According to a ninth aspect, this application provides an upstream packet sending apparatus, including an obtaining module and a sending module, where the apparatus is configured to implement the method according to any one of the third aspect or the implementations of the third aspect.

According to a tenth aspect, this application provides an upstream packet forwarding apparatus, including a receiving module, a determining module, and a sending module, where the apparatus is configured to implement the method according to any one of the fourth aspect or the implementations of the fourth aspect.

According to an eleventh aspect, this application provides a downstream packet sending apparatus, including a configuration module, a generation module, and a sending module, where the apparatus is configured to implement the method according to any one of the fifth aspect or the implementations of the fifth aspect.

According to a twelfth aspect, this application provides a downstream packet forwarding apparatus, including a receiving module, a determining module, and a sending module, where the apparatus is configured to implement the method according to any one of the sixth aspect or the implementations of the sixth aspect.

According to a thirteenth aspect, this application provides a gateway device, including:
one or more processors; and
a memory, configured to store one or more programs, where
when the one or more programs are executed by the one or more processors, the one or more processors are enabled to implement the method according to either of the first aspect or the fifth aspect. In a possible implementation, the gateway device may be a core switch.

According to a fourteenth aspect, this application provides a forwarding device, including:
one or more processors; and
a memory, configured to store one or more programs, where
when the one or more programs are executed by the one or more processors, the one or more processors are enabled to implement the method according to either of the fourth aspect or the sixth aspect. In a possible implementation, the forwarding device may be an access switch or an aggregation switch.

According to a fifteenth aspect, this application provides a terminal device, including:
one or more processors; and
a memory, configured to store one or more programs, where
when the one or more programs are executed by the one or more processors, the one or more processors are enabled to implement the method according to either of the second aspect or the third aspect. In a possible implementation, the terminal device may be user equipment.

According to a sixteenth aspect, this application provides a computer readable storage medium, where the computer readable storage medium stores an instruction. When the instruction is run on a computer, the computer is configured to perform the method according to any one of the first aspect to the sixth aspect.

According to a seventh aspect, this application provides a computer program product including an instruction, when the computer program product is run on a computer, the computer is configured to perform the method according to any one of the first aspect to the sixth aspect.

It should be noted that using a MAC address to indicate path information is an implementation of this application. In a specific implementation process, other content in a packet may alternatively be used to indicate path information, and an implementation principle thereof is similar to an implementation principle of using a MAC address to indicate path information.

DESCRIPTION OF EMBODIMENTS

The following describes technical solutions of this application with reference to the accompanying drawings.

Currently, an approach to simplifying an enterprise network is to simplify network traffic forwarding. For example, in an SDN, a flow-table mode is used. To be specific, a flow table corresponding to a data flow is delivered to a switch along a route, to control a forwarding path of the data flow. In the SDN, a control plane is separated from a forwarding plane. The forwarding plane is deployed on a forwarder, the control plane is deployed on a controller, and the controller and the forwarder complete information exchange by using an OpenFlow protocol. The controller completes creation of a flow table, and the forwarder completes data forwarding based on the flow table delivered by the controller. The flow table (Flow Table) is a service-independent forwarding table and mainly includes a matching field and an action. The controller directly controls a forwarding behavior of the forwarder by delivering the flow table, to control and manage the forwarder. The forwarder matches a packet with a matching field in the flow table, and executes a corresponding action when the packet matches a matching field. However, the SDN implements conversion from a conventional distributed forwarding architecture to a centralized forwarding architecture. As a result, large space for storing the flow stable is needed on the forwarding plane. Therefore, a degree of simplification of the network is limited.

Figure 1:
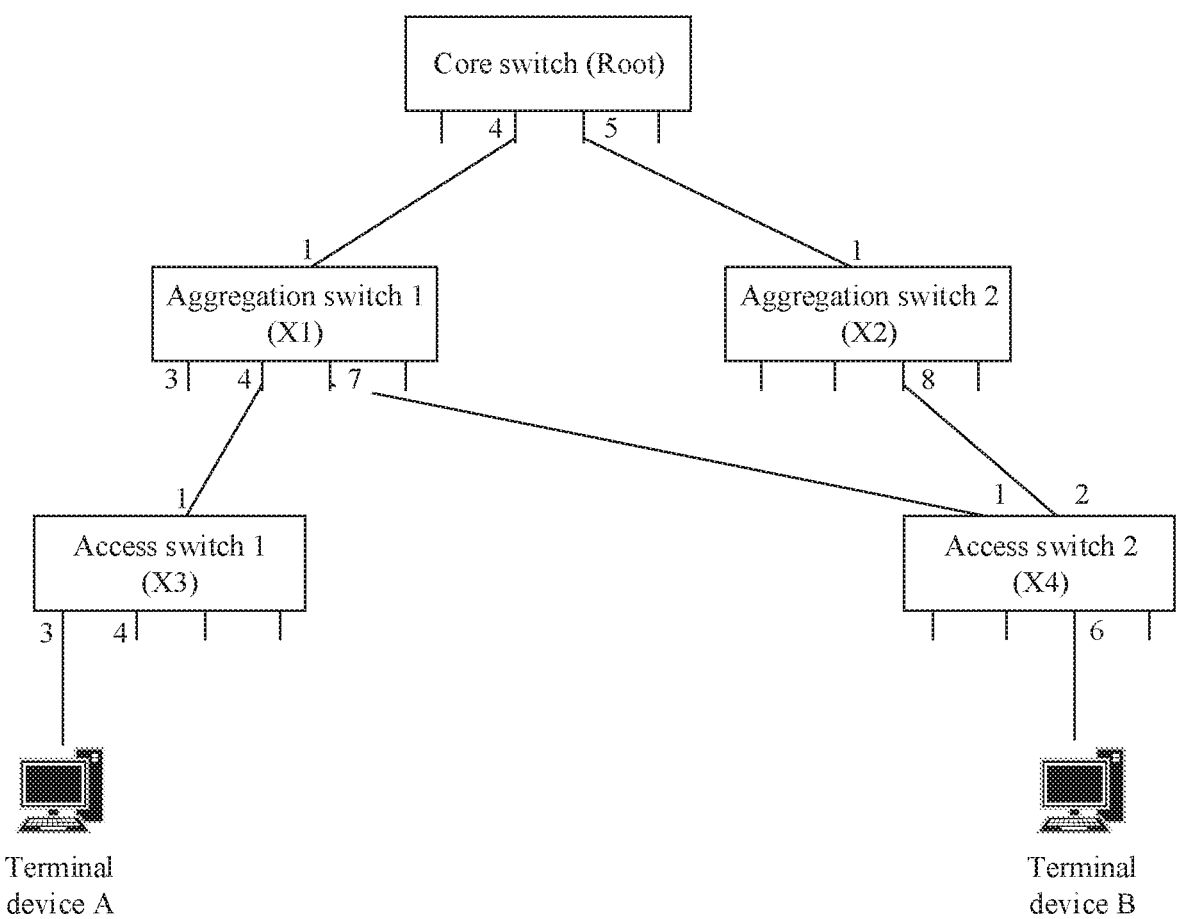
FIG. 1 is a schematic diagram of an architecture of an enterprise network according to an embodiment of this application.

To resolve the foregoing problem, this application provides a routing information delivery method. The method may be applied to any network architecture, for example, an enterprise network or a campus network. For example, FIG. 1 is a schematic diagram of an architecture of an enterprise network according to an embodiment of this application. As shown in FIG. 1, the enterprise network includes a core switch (Root), an aggregation switch 1 (X1), an aggregation switch 2 (X2), an access switch 1 (X3), an access switch 2 (X4), a terminal device A, and a terminal device B. A plurality of downstream egress ports and upstream egress ports are provided on each forwarding switch (each of the aggregation switch 1, the aggregation switch 2, the access switch 1, and the access switch 2), and different egress ports correspond to different forwarding paths.

TABLE 1

| Terminal device | IP address | Upstream forwarding path | Downstream forwarding path | Priority |
|---|---|---|---|---|
| A | 10.10.10.2 | X3.1→X1.1 | Root.4→X1.4→X3.3 | 1 |
| B | 10.10.20.3 | X4.1→X1.1 X4.2→X2.1 Active | Root.4→X1.7→X4.6 Root.5→X2.8→X4.6 Active | 7 |

Figure 2:
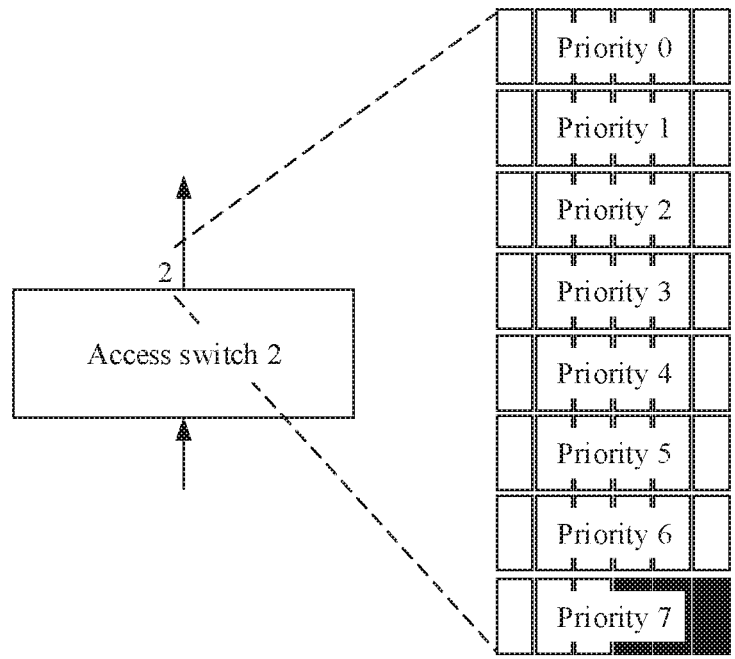
FIG. 2 is a schematic diagram of priorities in an architecture of an enterprise network according to an embodiment of this application.

Table 1 is a flow table of an embodiment of an architecture of an enterprise network according to this application. As shown in Table 1, the IP address of the terminal device A is 10.10.10.2, there is an upstream forwarding path (X3.1→X1.1) and a downstream forwarding path (Root.4→X1.4→X3.3), and the priority of the terminal device A is 1. The IP address of the terminal device B is 10.10.20.3, there are two upstream forwarding paths (X4.1→X1.1 and X4.2→X2.1) and two downstream forwarding paths (Root.4→X1.7→X4.6 and Root.5→X2.8→X4.6), and the priority of the terminal device B is 7. A label "Active" is used to record a currently used forwarding path of the two upstream forwarding paths of the terminal device B. Similarly, a label "Active" is also used to record a currently used forwarding path of the two downstream forwarding paths of the terminal device B. A priority of a terminal device represents a class of service (CoS) of the terminal device, and each egress port of a forwarding switch corresponds to a plurality of CoS queues. For example, FIG. 2 is a schematic diagram of priorities in an architecture of an enterprise network according to an embodiment of this application. As shown in FIG. 2, an upstream egress port 2 of an access switch 2 corresponds to eight CoS queues. The priority of the terminal device B is 7. Therefore, in the access switch 2, an upstream packet of the terminal device B is included in a CoS queue whose priority is 7.

It can be learned from Table 1 that a packet between the core switch and the terminal device A is forwarded by the aggregation switch 1 and the access switch 1, and a packet between the core switch and the terminal device B is forwarded by the aggregation switch 1 or 2 and the access switch 2. When sending a downstream packet to a terminal device, the core switch needs to notify, to a forwarding switch on a downstream forwarding path, a downstream egress port for sending the downstream packet. When sending an upstream packet to the core switch, a terminal device also needs to notify, to a forwarding switch on an upstream forwarding path, an upstream egress port for sending the upstream packet. However, the terminal device cannot learn of a whole network topology, and therefore needs to request, from the core switch that knows the network topology, the upstream forwarding path for sending the upstream packet.

The following describes in detail a technical solution of a method embodiment of this application by using a specific embodiment and using the enterprise network shown in FIG. 1 as an application scenario.

Figure 3:
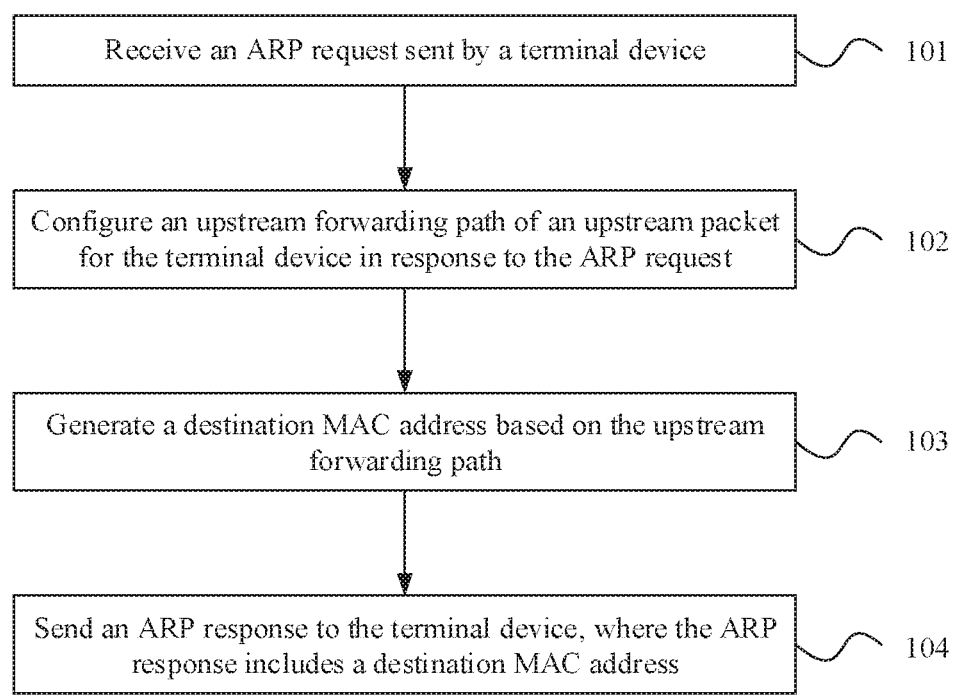
FIG. 3 is a flowchart of a routing information delivery method according to an embodiment of this application.

FIG. 3 is a flowchart of a routing information delivery method according to an embodiment of this application. As shown in FIG. 3, the routing information delivery method may be performed by the core switch in FIG. 1. The method may include the following steps.

Step 101. Receive an ARP request sent by a terminal device.

Step 102. Configure an upstream forwarding path of an upstream packet for the terminal device in response to the ARP request.

In this application, the terminal device that needs to send the upstream packet sends the ARP request to the core switch. The core switch configures the upstream forwarding path for the terminal device, that is, determines a forwarding switch through which the upstream packet needs to pass in a process of being forwarded from the terminal device to the core switch and determines an egress port that is of the forwarding switch and through which the upstream packet is sent. The core switch can discover, from a network topology, an upstream forwarding path from the terminal device to the core switch. If there is only one upstream forwarding path, this path is selected. If there are a plurality of upstream forwarding paths, one of the upstream forwarding paths is selected. The following selection modes are available: In one mode, an upstream forwarding path is selected arbitrarily. In another mode, traffic of a plurality of paths is monitored, and a path with light load is selected. In still another mode, a path is selected by hashing a source MAC address.

Step 103. Generate a destination MAC address based on the upstream forwarding path.

In this application, the destination MAC address is actually indication information used to indicate the upstream forwarding path. To be compatible with an existing network, an encapsulation mode of an existing destination MAC address is used. In other words, the indication information is provided in a form of the destination MAC address. It can be understood that using a MAC address to indicate path information is an implementation of this application. In a specific implementation process, other content in a packet may alternatively be used to indicate path information. The core switch generates the destination MAC address based on the upstream forwarding path, and writes, into a predetermined byte in the destination MAC address, an egress port number of each forwarding switch in a process of forwarding the upstream packet. For example, in this application, the core switch may generate the following destination MAC address for the terminal device B based on information in Table 1:

02.E0.00.00.01.02

In the destination MAC address, the most significant byte (02) is used to represent a type of the destination MAC address, and 02 represents that the MAC address is a destination MAC address that carries a forwarding path and a priority of the terminal device. If the most significant byte is 01, it may represent that the MAC address is a multicast MAC address. The second most significant byte (E0) is used to represent the priority of the terminal device B. For example, the 3 most significant bits of the second most significant byte (E0) are used to represent the priority of the terminal device B. E0 is 11100000 in binary, and the 3 most significant bits is 111, representing that a priority that is of the terminal device B and that corresponds to the destination MAC address is 7. In addition to the forwarding path, the destination MAC address may further include the priority of the terminal device. In this way, when forwarding a packet of the terminal device, a forwarding device may determine, based on the priority, a turn to send the packet. Bytes from the least significant byte to a higher-order byte are used to respectively represent in sequence egress ports of forwarding switches on an upstream forwarding path of an upstream packet of the terminal device B. The least significant byte 02 represents that after the upstream packet enters an access switch 2 from the terminal device B, the access switch 2 is to send the upstream packet through an egress port 2. The second least significant byte 01 represents that after the upstream packet arrives at an aggregation switch 2 from the egress port 2 of the access switch 2, the aggregation switch 2 is to send the upstream packet through an egress port 1, so that the upstream packet can arrive at the core switch. According to the destination MAC address (02.E0.00.00.01.02) in the example, an architecture of an enterprise network with a depth of up to five layers can be supported. It should be noted that the foregoing destination MAC address is an example of the destination MAC address used in this embodiment of this application. Both a destination MAC address and a source MAC address in the following embodiments can use this format. However, this application does not limit a method for addressing forwarding paths and priorities in the destination MAC address and the source MAC address.

Step 104. Send an ARP response to the terminal device, where the ARP response includes the destination MAC address.

The core switch sends the destination MAC address to the terminal device by using the address resolution protocol (ARP) response. The terminal device writes the destination MAC address into a locally stored ARP table. In this way, each terminal device can learn of an upstream forwarding path of an upstream packet configured for the terminal device by the core switch. In this application, the terminal device sends the ARP request to the core switch, and the core switch sends the destination MAC address to the terminal device by using the ARP response. In this way, an existing Ethernet protocol can be completely inherited.

In this application, routing information is written into the destination MAC address, and the routing information is delivered by using an existing ARP, thereby reducing costs, improving efficiency, and simplifying network traffic.

Figure 4:
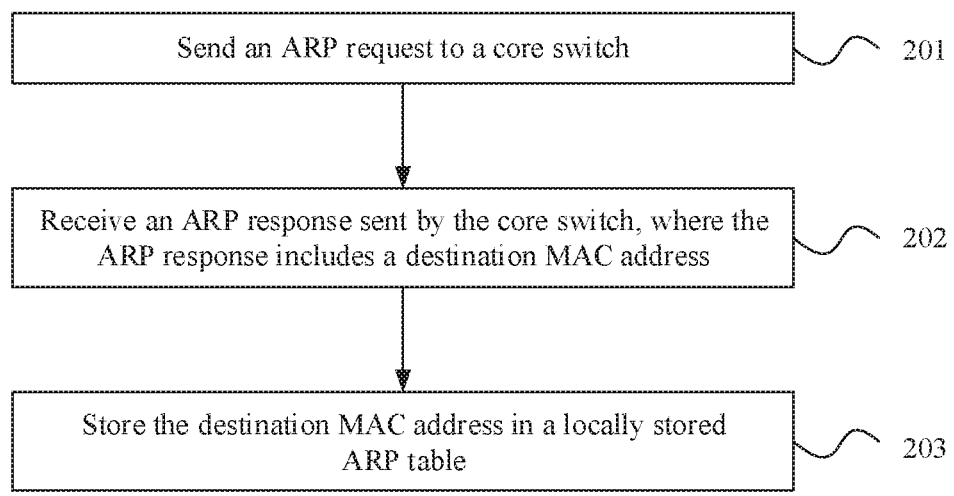
FIG. 4 is a flowchart of a routing information obtaining method according to an embodiment of this application.

FIG. 4 is a flowchart of a routing information obtaining method according to an embodiment of this application. As shown in FIG. 4, the routing information obtaining method may be performed by a terminal device (A or B) in FIG. 1. The technical solution in this embodiment corresponds to the technical solution in the method embodiment shown in FIG. 3. Routing information is delivered through information exchange between a core switch and the terminal device. The method in this embodiment may include the following steps.

Step 201. Send an ARP request to a core switch.

The ARP request is used to trigger the core switch to configure an upstream forwarding path of an upstream packet sent by the terminal device and generate a destination MAC address based on the upstream forwarding path, where the destination MAC address is used to indicate the upstream forwarding path.

Step 202. Receive an ARP response sent by the core switch, where the ARP response includes the destination MAC address.

In this application, the terminal device sends the ARP request to the core switch, and the core switch sends the destination MAC address to the terminal device by using the ARP response. In this way, an existing Ethernet protocol can be completely inherited.

Step 203. Store the destination MAC address in a locally stored ARP table.

The terminal device maintains the ARP table locally. The terminal device obtains the destination MAC address by parsing the ARP response, and adds the destination MAC address to the ARP table.

In this application, routing information is written into the destination MAC address, and the routing information is delivered by using an existing ARP, thereby reducing costs, improving efficiency, and simplifying network traffic.

Figure 5:
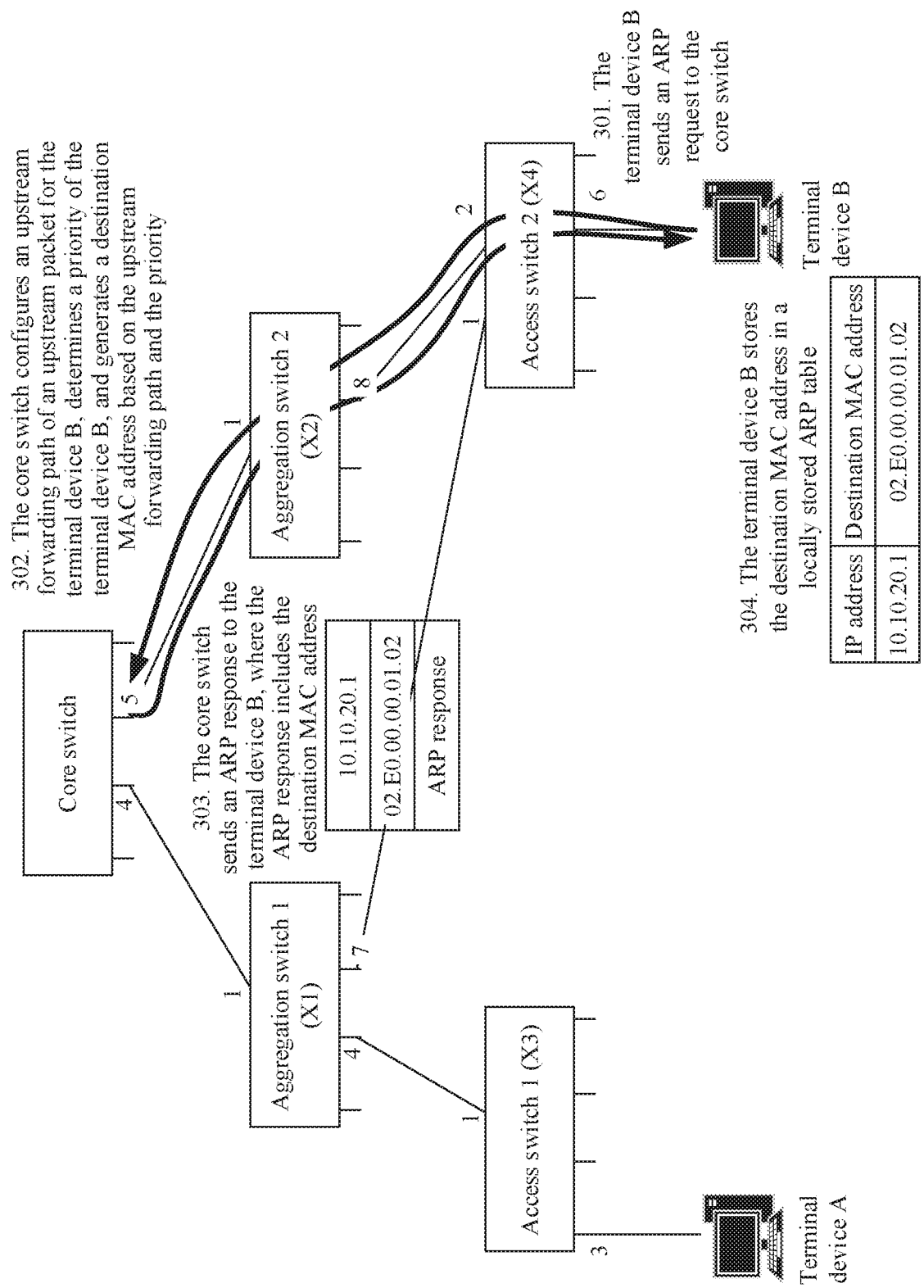
FIG. 5 is a flowchart of a routing information exchange method according to an embodiment of this application.

On a basis of the method embodiments shown in FIG. 3 and FIG. 4, FIG. 5 is a flowchart of a routing information exchange method according to an embodiment of this application. As shown in FIG. 5, the method in this embodiment may include the following steps.

Step 301. A terminal device B sends an ARP request to a core switch.

The terminal device B sends the ARP request, where the ARP request may be forwarded to the core switch by a forwarding switch, or may be forwarded to the core switch by another network node or a communication link. If the ARP request is forwarded by the forwarding switch, the forwarding switch may arbitrarily select an upstream egress port for sending the ARP request.

Step 302. The core switch configures an upstream forwarding path of an upstream packet for the terminal device B, determines a priority of the terminal device B, and generates a destination MAC address based on the upstream forwarding path and the priority.

Based on Table 1, an upstream forwarding path configured for the terminal device B by the core switch is X4.2→X2.1, and a destination MAC address 02.E0.00.00.01.02 is generated based on the upstream forwarding path and the priority 7 of the terminal device B in the flow table.

Step 303. The core switch sends an ARP response to the terminal device B, where the ARP response includes the destination MAC address.

The core switch sends the ARP response to the terminal device B, where the ARP response carries the destination MAC address 02.E0.00.00.01.02 and may further carry an IP address 10.10.20.1 of the core switch. Similarly, the ARP response may be forwarded to the terminal device by a forwarding switch, or may be forwarded to the terminal device by another network node or a communication link. If the ARP response is forwarded by the forwarding switch, the forwarding switch may arbitrarily select a downstream egress port for sending the ARP response.

Step 304. The terminal device B stores the destination MAC address in a locally stored ARP table.

After receiving the ARP response, the terminal device B obtains the destination MAC address and a gateway IP address through parsing, and adds the destination MAC address and the gateway IP address to the ARP table.

In this embodiment, routing information is written into the destination MAC address, and the routing information is delivered by using an existing ARP, thereby reducing costs, improving efficiency, and simplifying network traffic.

Figure 6:
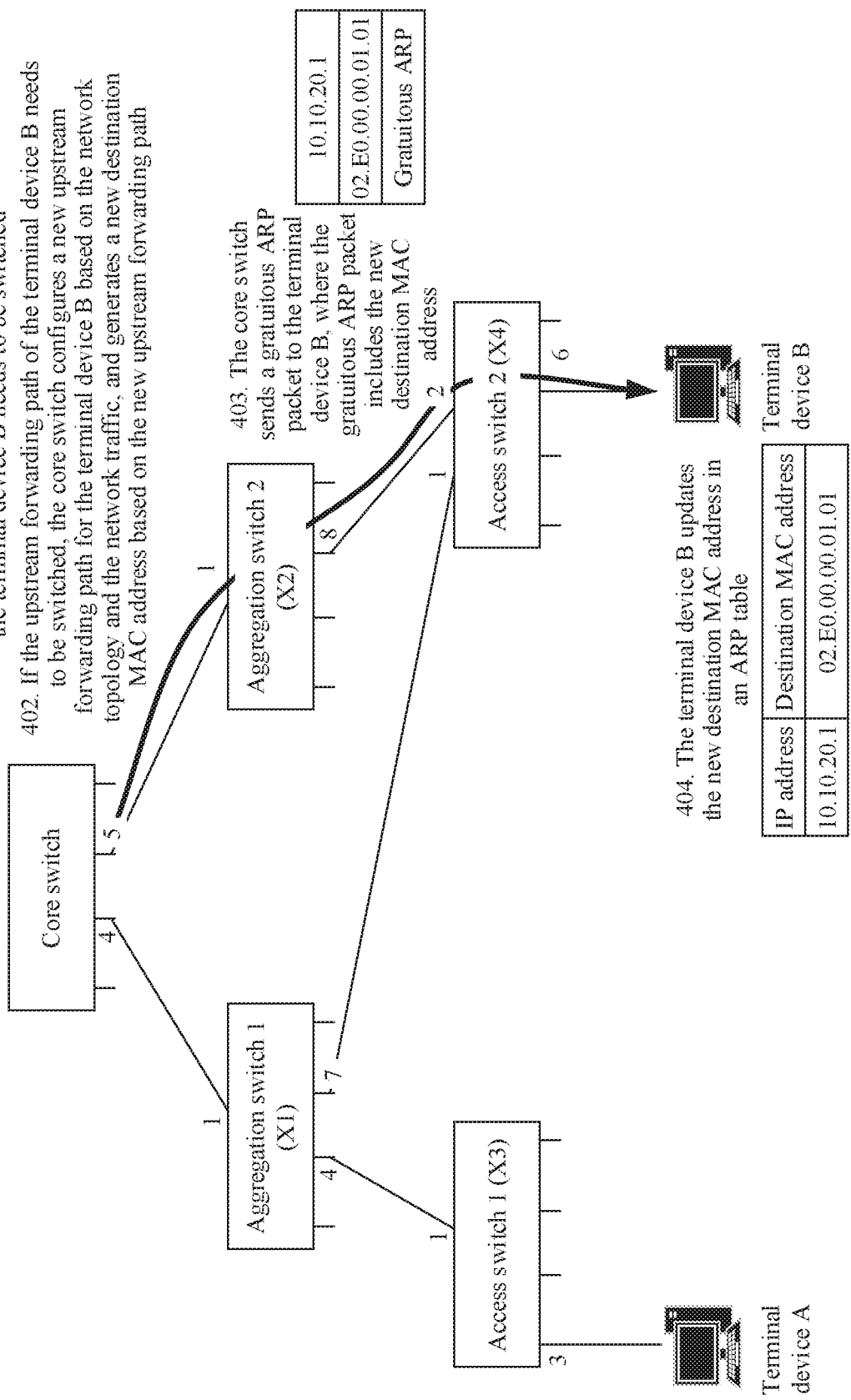
FIG. 6 is a flowchart of another routing information exchange method according to an embodiment of this application.

On a basis of the method embodiments shown in FIG. 3 and FIG. 4, FIG. 6 is a flowchart of another routing information exchange method according to an embodiment of this application. As shown in FIG. 6, the method in this embodiment may include the following steps.

Step 401. The core switch determines, based on a network topology and network traffic, whether the upstream forwarding path of the terminal device needs to be switched B.

The core switch controls traffic forwarding of a whole network; and can learn of a forwarding path of each packet and traffic of each path according to the network topology. The core switch determines, based on such information, whether the upstream forwarding path of the terminal device needs to be switched B (in other words, whether the upstream forwarding path of the terminal device B needs to be redirected), to implement upstream load balancing for the terminal device B.

TABLE 2

| Terminal device | IP address | Upstream forwarding path | Downstream forwarding path | Upstream traffic | Downstream traffic |
| --- | --- | --- | --- | --- | --- |
| A | 10.10.10.2 | X3.1→X1.1 | Root.4→X1.4 →X3.3 | 10 Mbps | 5 Mbps |
| B | 10.10.20.3 | X4.1→X1.1 X4.2→X2.1 Active | Root.4→X1.7 →X4.6 Root.5→X2.8 →X4.6 Active | 15 Mbps | 12 Mbps |

TABLE 3

| Path number | Forwarding path | Forwarding path type | Traffic |
| --- | --- | --- | --- |
| 1 | X3.1→X1.1 | Upstream | 10 Mbps |
| 2 | X4.1→X1.1 | Upstream | 10 Mbps |
| 3 | X4.2→X2.1 | Upstream | 43 Mbps |
| 4 | Root.4→X1.4 | Downstream | 5 Mbps |
| 5 | Root.4→X1.7 | Downstream | 5 Mbps |
| 6 | Root.5→X2.8 | Downstream | 28 Mbps |

Table 2 is a flow table used before the upstream forwarding path is switched in Embodiment 2 of the routing information delivery method according to this application. Table 3 is a flow table used before the upstream forwarding path is switched in Embodiment 2 of the routing information delivery method according to this application. As shown in Table 2 and Table 3, traffic of an originally configured upstream forwarding path X4.2→X2.1 of the terminal device B reaches 43 Mbps, and traffic of the other upstream forwarding path X4.1→X1.1 is only 10 Mbps. Therefore, the core switch determines that the upstream forwarding path of the terminal device B needs to be switched.

Step 402. If the upstream forwarding path of the terminal device needs to be switched B, the core switch configures a new upstream forwarding path for the terminal device B based on the network topology and the network traffic, and generates a new destination MAC address based on the new upstream forwarding path.

TABLE 4

| Terminal device | IP address | Upstream forwarding path | Downstream forwarding path | Upstream traffic | Downstream traffic |
|---|---|---|---|---|---|
| A | 10.10.10.2 | X3.1→X1.1 | Root.4→X1.4 →X3.3 | 10 Mbps | 5 Mbps |
| B | 10.10.20.3 | X4.1→X1.1 Active X4.2→X2.1 | Root.4→X1.7 →X4.6 Root.5→X2.8 →X4.6 Active | 15 Mbps | 12 Mbps |

Table 4 is a flow table used after the upstream forwarding path is switched in Embodiment 2 of the routing information delivery method according to this application. As shown in Table 4, the new upstream forwarding path configured for the terminal device B by the core switch is X4.1→X1.1. The core switch generates a new destination MAC address 02.E0.00.00.01.01 based on the new upstream forwarding path.

Step 403. The core switch sends a gratuitous ARP packet to the terminal device B, where the gratuitous ARP packet includes the new destination MAC address.

The core switch sends the gratuitous ARP packet to the terminal device B, where the gratuitous ARP packet carries the new destination MAC address 02.E0.00.00.01.01 and may further carry an IP address 10.10.20.1 of the core switch. Similarly, the gratuitous ARP packet may be forwarded to the terminal device by a forwarding switch, or may be forwarded to the terminal device by another network node or a communication link. If the gratuitous ARP packet is forwarded by the forwarding switch, the forwarding switch arbitrarily selects a downstream egress port for sending the gratuitous ARP packet.

Step 404. The terminal device B updates the new destination MAC address into an ARP table.

After receiving the gratuitous ARP packet, the terminal device B obtains the destination MAC address and a gateway IP address through parsing, and then updates a corresponding entry in the ARP table.

TABLE 5

| Path number | Forwarding path | Forwarding path type | Traffic |
|---|---|---|---|
| 1 | X3.1→X1.1 | Upstream | 10 Mbps |
| 2 | X4.1→X1.1 | Upstream | 25 Mbps |
| 3 | X4.2→X2.1 | Upstream | 28 Mbps |
| 4 | Root.4→X1.4 | Downstream | 5 Mbps |
| 5 | Root.4→X1.7 | Downstream | 5 Mbps |
| 6 | Root.5→X2.8 | Downstream | 28 Mbps |

Table 5 is a flow table used after the upstream forwarding path is switched in Embodiment 2 of the routing information delivery method according to this application. As shown in FIG. 5, after the upstream forwarding path of the terminal device B is switched to the new upstream forwarding path, traffic on both upstream forwarding paths of the terminal device B is changed. Traffic on the upstream forwarding path X4.2→X2.1 is reduced to 28 Mbps, and traffic on the upstream forwarding path X4.1→X1.1 is increased to 25 Mbps, thereby achieving load balancing between the two upstream forwarding paths.

In this embodiment, routing information is written into the destination MAC address, and the upstream forwarding path of the terminal device is redirected by using an existing ARP.

Figure 7:
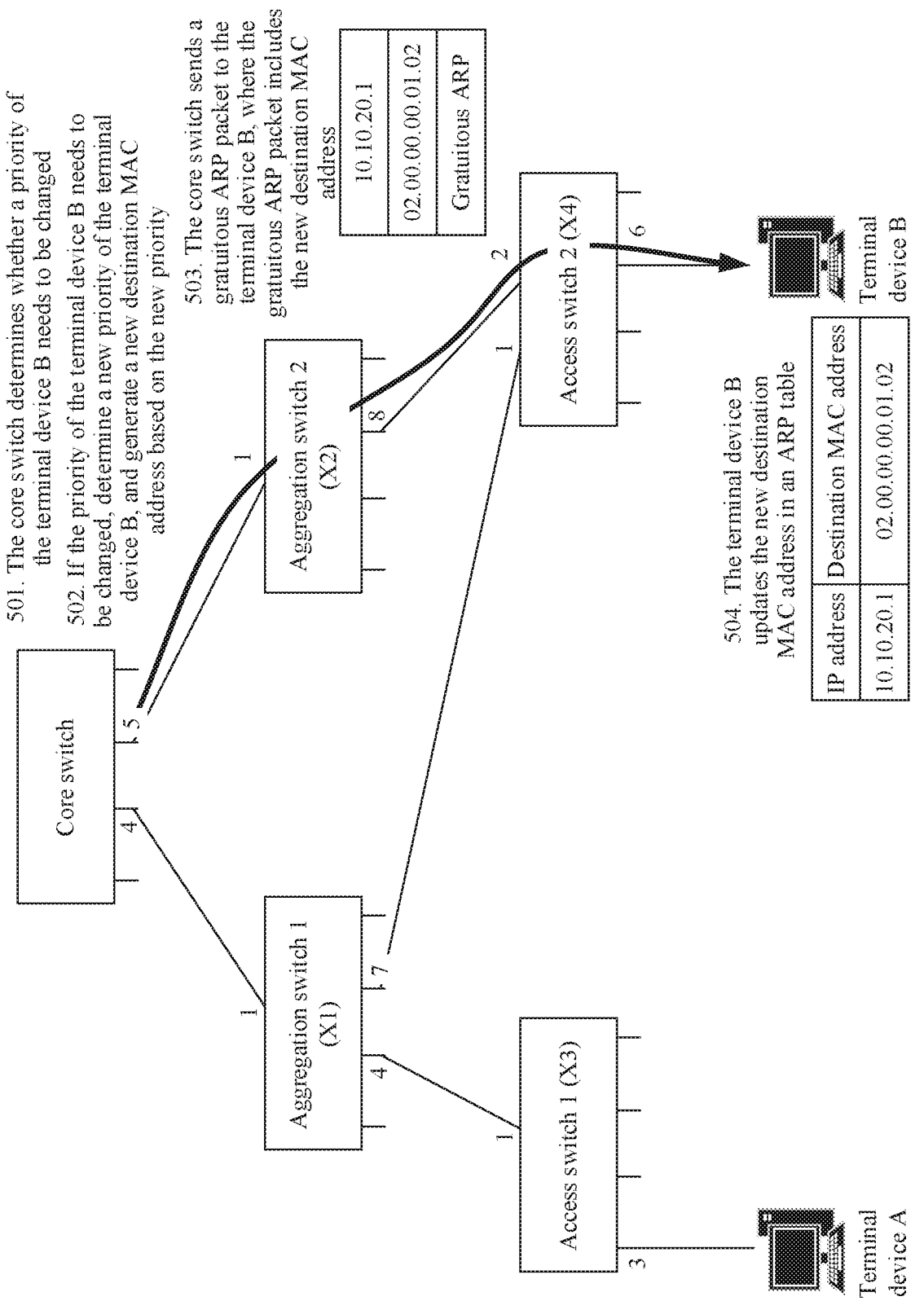
FIG. 7 is a flowchart of a priority changing method according to an embodiment of this application.

On a basis of the method embodiments shown in FIG. 3 and FIG. 4. FIG. 7 is a flowchart of a priority changing method according to an embodiment of this application. As shown in FIG. 7, the method in this embodiment may include the following steps.

Step 501. A core switch determines whether a priority of a terminal device B needs to be changed.

The core switch may change a class of service of a user based on a service requirement, that is, change the priority of the terminal device, to provide a more optimized service.

Step 502. If the priority of the terminal device needs to be changed B, determine a new priority of the terminal device B, and generate a new destination MAC address based on the new priority.

An original priority of the terminal device B is 7, and now the priority of the terminal device B needs to be changed to 0. The core switch refreshes a flow table entry of the terminal device B to change a priority field from 7 to 0, and generates a new destination MAC address 02.00.00.00.01.02.

TABLE 6

| Terminal device | IP address | Upstream forwarding path | Downstream forwarding path | Priority |
|---|---|---|---|---|
| A | 10.10.10.2 | X3.1→X1.1 | Root.4→X1.4→X3.3 | 1 |
| B | 10.10.20.3 | X4.1→X1.1 X4.2→X2.1 Active | Root.4→X1.7→X4.6 Root.5→X2.8→X4.6 Active | 0 |

Table 6 is a flow table used after the priority is changed in this embodiment of the priority changing method according to this application. As shown in Table 6, the priority of the terminal device B is changed from 7 in Table 1 to 0.

Step 503. The core switch sends a gratuitous ARP packet to the terminal device B, where the gratuitous ARP packet includes the new destination MAC address.

The core switch sends the gratuitous ARP packet to the terminal device B, where the gratuitous ARP packet carries the new destination MAC address 02.00.00.00.01.02 and may further carry an IP address 10.10.20.1 of the core switch. Similarly, the gratuitous ARP packet may be forwarded to the terminal device by a forwarding switch, or may be forwarded to the terminal device by another network node or a communication link. If the gratuitous ARP packet is forwarded by the forwarding switch, the forwarding switch arbitrarily selects a downstream egress port for sending the gratuitous ARP packet.

Step 504. The terminal device B updates the new destination MAC address into an ARP table.

After receiving the gratuitous ARP packet, the terminal device B obtains the destination MAC address and a gateway IP address through parsing, and then updates a corresponding entry in the ARP table.

In this embodiment, the priority is written into the destination MAC address, and the class of service of the user is changed by using an existing ARP.

In the foregoing method embodiment, the core switch may add an upstream forwarding path to the destination MAC address and send the destination MAC address to the terminal device. After receiving the destination MAC address, the terminal device updates the ARP table in a timely manner, and subsequently sends an upstream packet by using the destination MAC address as routing information for upstream packet forwarding.

Figure 8:
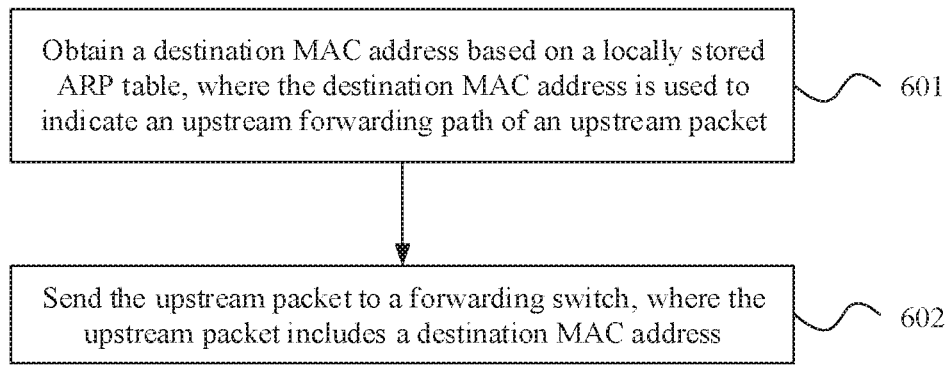
FIG. 8 is a flowchart of an upstream packet sending method according to an embodiment of this application.

FIG. 8 is a flowchart of an upstream packet sending method according to an embodiment of this application. As shown in FIG. 8, the upstream packet sending method may be performed by a terminal device (A or B) in FIG. 1. The method may include the following steps.

Step 601. Obtain a destination MAC address based on a locally stored ARP table, where the destination MAC address is used to indicate an upstream forwarding path of an upstream packet.

When the terminal device needs to send the upstream packet, the terminal device first obtains a destination MAC address of a core switch from the ARP table, where the destination MAC address is configured for the terminal device by the core switch in the foregoing embodiment, and is used to indicate the upstream forwarding path of the upstream packet sent by the terminal device.

When a terminal device sends an upstream packet, in an existing network, a source MAC address and a destination MAC address are encapsulated into the upstream packet, where the source MAC address is a MAC address of the terminal device, and the destination MAC address is a MAC address of a destination device of the upstream packet. In this application, to be compatible with this format, the destination MAC address is also encapsulated into the upstream packet, and a difference lies in that the destination MAC address is used to indicate a destination MAC address of the upstream forwarding path.

Step 602. Send the upstream packet to a forwarding switch, where the upstream packet includes the destination MAC address.

The terminal device may send the upstream packet into which the destination MAC address is encapsulated to the forwarding switch through a connection port with the forwarding switch.

In this embodiment, the terminal device adds, to the upstream packet, the destination MAC address that indicates the upstream forwarding path, so that the forwarding switch can forward the upstream packet based on the destination MAC address, without requiring a label or storing an entry in a forwarding process, thereby reducing costs, improving efficiency, and simplifying network traffic.

Figure 9:
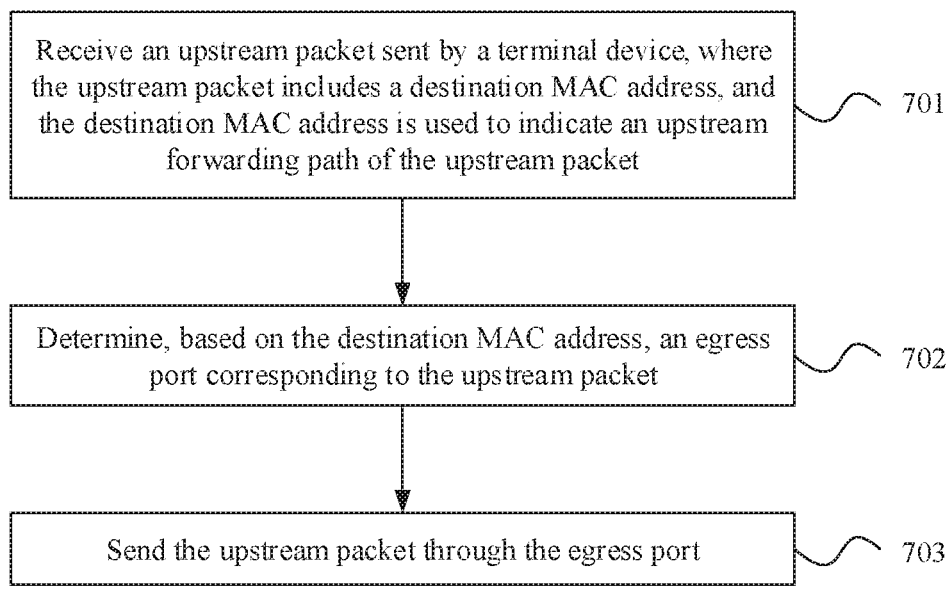
FIG. 9 is a flowchart of an upstream packet forwarding method according to an embodiment of this application.

FIG. 9 is a flowchart of an upstream packet forwarding method according to an embodiment of this application. As shown in FIG. 9, the upstream packet sending method may be performed by a forwarding switch (the aggregation switch 1, the aggregation switch 2, the access switch 1, and the access switch 2) in FIG. 1. A technical solution in this embodiment corresponds to the technical solution in the method embodiment shown in FIG. 8. An upstream packet is sent and forwarded through information exchange between a terminal device and the forwarding switch. The method in this embodiment may include the following steps.

Step 701. Receive an upstream packet sent by the terminal device, where the upstream packet includes a destination MAC address, and the destination MAC address is used to indicate an upstream forwarding path of the upstream packet.

Step 702. Determine, based on the destination MAC address, an egress port corresponding to the upstream packet.

After receiving the upstream packet, the forwarding switch directly obtains the destination MAC address by parsing the upstream packet, and searches for a non-zero byte starting from the least significant byte to a higher-order byte. In this case, an egress port indicated by a value of the first non-zero byte is a next-hop egress port. Then, the forwarding switch sets a bit used to indicate the egress port to zero. As described above, after obtaining the non-zero byte through searching starting from the least significant byte to the higher-order byte, the forwarding switch may set corresponding bits to zero based on a quantity of bits representing the egress port. For example, if the egress port is represented by using 6 bits, the forwarding switch needs to set the 6 bits to zero; if the egress port is represented by using 2 bytes (16 bits), the forwarding switch needs to set the 16 bits to zero. This application does not specifically limit the quantity of bits representing the egress port.

Step 703. Send the upstream packet through the egress port.

The forwarding switch may place the upstream packet into a forwarding queue corresponding to a priority of the terminal device that sends the upstream packet, and send the upstream packet through the next-hop egress port when it comes the turn to send the upstream packet.

In this embodiment, the terminal device adds, to the upstream packet, the destination MAC address that indicates the upstream forwarding path, so that the forwarding switch can forward the upstream packet based on the destination MAC address, without requiring a label or storing an entry in a forwarding process, thereby reducing costs, improving efficiency, and simplifying network traffic.

Figure 10:
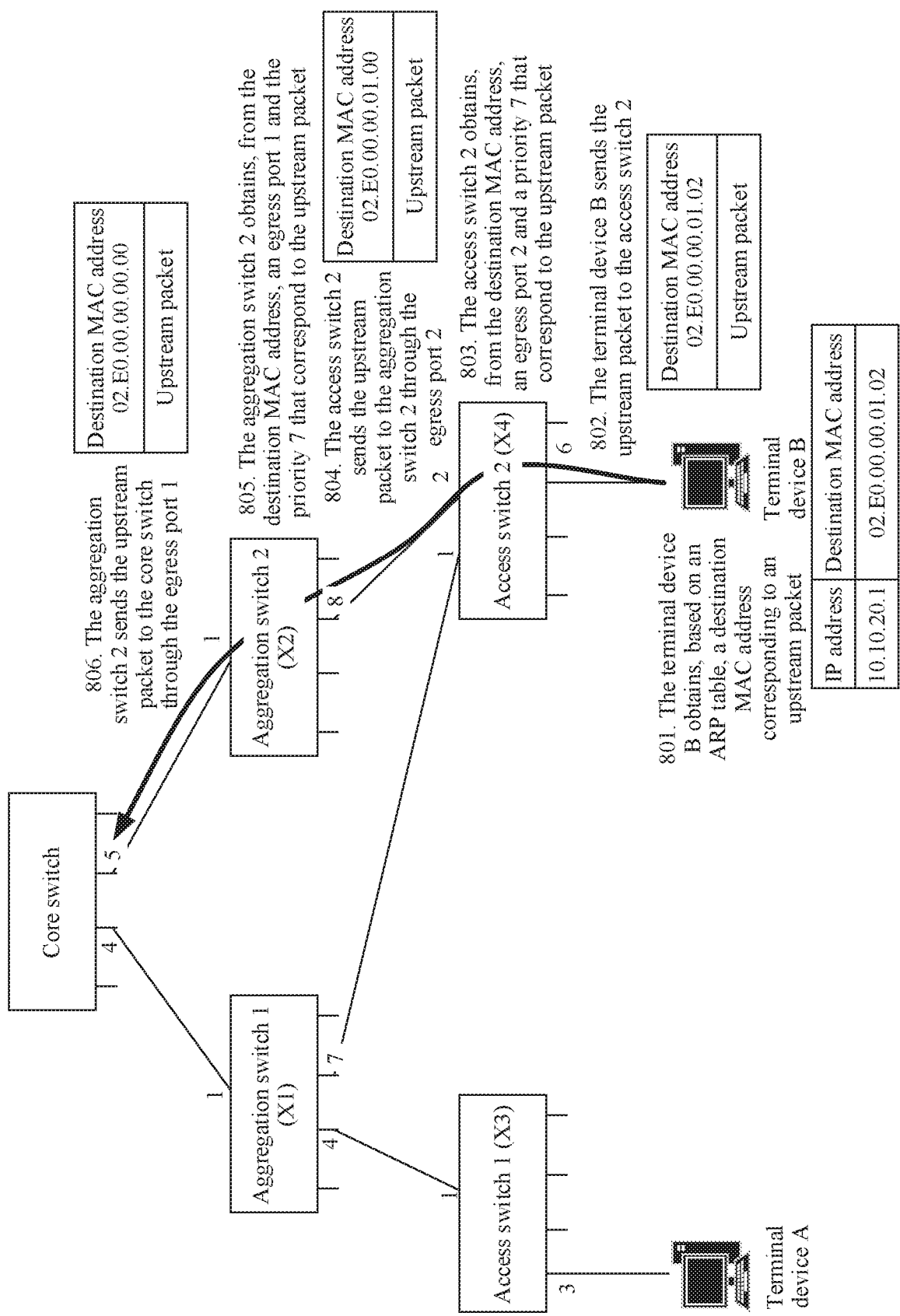
FIG. 10 is a flowchart of an upstream packet sending and forwarding method according to an embodiment of this application.

On a basis of the method embodiments shown in FIG. 8 and FIG. 9, FIG. 10 is a flowchart of an upstream packet sending and forwarding method according to an embodiment of this application. As shown in FIG. 10, the method in this embodiment may include the following steps.

Step 801. A terminal device B obtains, based on an ARP table, a destination MAC address corresponding to an upstream packet.

When the terminal device B needs to send the upstream packet, the terminal device B first obtains a destination MAC address 02.E0.00.00.01.02 of a gateway (a core switch) for the ARP table, and encapsulates the destination MAC address into the upstream packet.

Step 802. The terminal device B sends the upstream packet to an access switch 2.

The terminal device B sends the upstream packet into which the destination MAC address is encapsulated to the access switch through a connection port with the access switch 2.

Step 803. The access switch 2 obtains, from the destination MAC address, an egress port 2 and a priority 7 that correspond to the upstream packet.

After receiving the upstream packet, the access switch 2 directly obtains the destination MAC address 02.E0.00.00.01.02 by parsing the upstream packet, and searches for a non-zero byte starting from the least significant byte to a higher-order byte. In this case, a value of the first non-zero byte represents that a next-hop egress port is 2. After determining the egress port 2, the access switch 2 sets the first non-zero byte (the least significant byte) to zero. The access switch 2 further learns, by parsing the 3 most significant bits in the second most significant byte, that a priority of the terminal device B is 7. Therefore, the access switch 2 places the upstream packet into a forwarding queue whose priority is 7, and sends the upstream packet through the egress port 2 when it comes to the turn of the upstream packet.

Step 804. The access switch 2 sends the upstream packet to an aggregation switch 2 through the egress port 2.

Step 805. The aggregation switch 2 obtains, from a destination MAC address, an egress port 1 and a priority 7 that correspond to the upstream packet.

After the upstream packet arrives at the aggregation switch 2, processing by the aggregation switch 2 is similar to the processing by the access switch 2. To be specific, the aggregation switch 2 directly obtains a destination MAC address 02.E0.00.00.01.00 by parsing the upstream packet, and searches for a non-zero byte starting from the least significant byte to the higher-order byte. In this case, the first non-zero byte is the second least significant byte, and a value of the second least significant byte represents that a next-hop egress port is 1. After determining the egress port 1, the aggregation switch 2 sets the first non-zero byte (the second least significant byte) to zero. The aggregation switch 2 further learns, by parsing the 3 most significant bits in the second most significant byte, that the priority of the terminal device B is 7. Therefore, the aggregation switch places the upstream packet into a forwarding queue whose priority is 7, and sends the upstream packet through the egress port 1 when it comes to the turn of the upstream packet.

Step 806. The aggregation switch 2 sends the upstream packet to a core switch through the egress port 1.

In this embodiment, the terminal device adds, to the upstream packet, the destination MAC address that indicates the upstream forwarding path, so that a forwarding switch can forward the upstream packet based on the destination MAC address, without requiring a label or storing an entry in a forwarding process, thereby reducing costs, improving efficiency, and simplifying network traffic.

Figure 11:
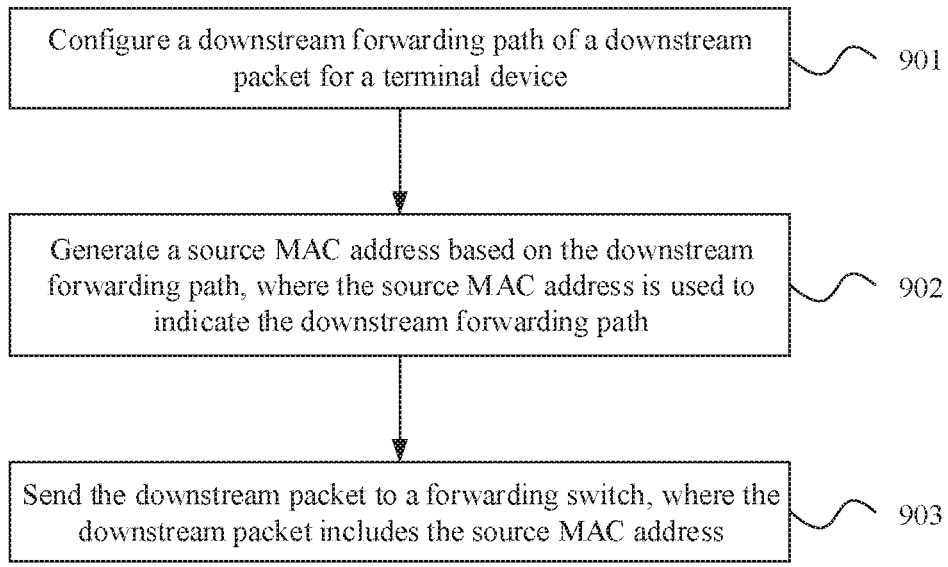
FIG. 11 is a flowchart of a downstream packet sending method according to an embodiment of this application.

FIG. 11 is a flowchart of a downstream packet sending method according to an embodiment of this application. As shown in FIG. 11, the downstream packet sending method may be performed by the core switch in FIG. 1. The method may include the following steps.

Step 901. Configure a downstream forwarding path of a downstream packet for a terminal device.

When the core switch needs to send the downstream packet to the terminal device, the core switch first needs to determine the downstream forwarding path of the downstream packet to be sent to the terminal device. The core switch may configure the downstream forwarding path for the terminal device based on a label "Active" in Table 1.

Step 902. Generate a source MAC address based on the downstream forwarding path, where the source MAC address is used to indicate the downstream forwarding path.

When a core switch sends a downstream packet, in an existing network, a source MAC address and a destination MAC address are encapsulated into the downstream packet, where the source MAC address is a MAC address of the core switch, and the destination MAC address is a MAC address of a destination device of the downstream packet. In this application, to be compatible with this format, the source MAC address is also encapsulated into the upstream packet, and a difference lies in that the source MAC address is used to indicate a source MAC address of the downstream forwarding path.

Step 903. Send the downstream packet to a forwarding switch, where the downstream packet includes the source MAC address.

The core switch sends the downstream packet into which the source MAC address is encapsulated to the forwarding switch through a connection port with the forwarding switch.

In this embodiment, the core switch adds, to the downstream packet, the source MAC address that indicates the downstream forwarding path, so that the forwarding switch can forward the downstream packet based on the source MAC address, without requiring a label or storing an entry in a forwarding process, thereby reducing costs, improving efficiency, and simplifying network traffic.

Figure 12:
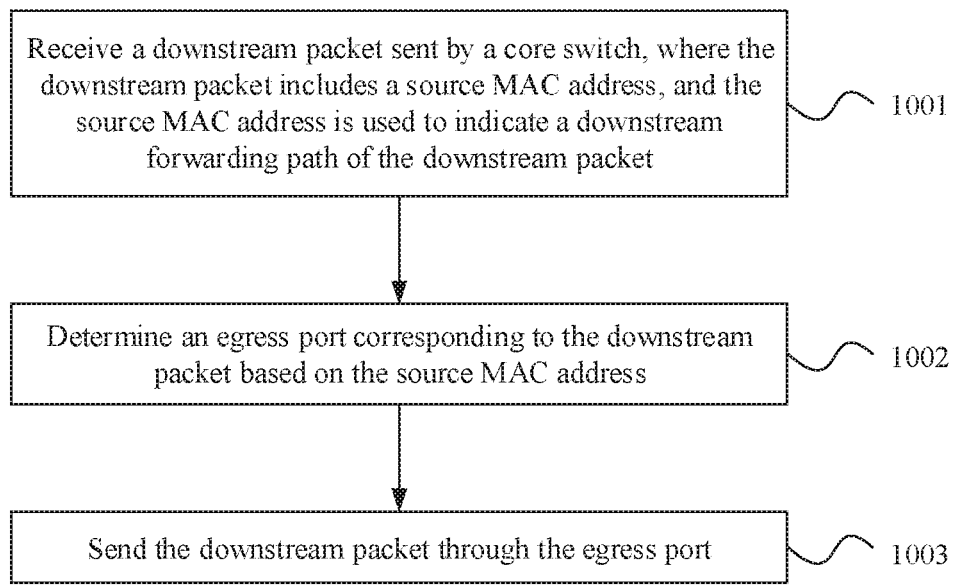
FIG. 12 is a flowchart of a downstream packet forwarding method according to an embodiment of this application.

FIG. 12 is a flowchart of a downstream packet forwarding method according to an embodiment of this application. As shown in FIG. 12, the downstream packet sending method may be performed by a forwarding switch (the aggregation switch 1, the aggregation switch 2, the access switch 1, and the access switch 2) in FIG. 1. A technical solution in this embodiment corresponds to the technical solution in the method embodiment shown in FIG. 11. A downstream packet is sent and forwarded through information exchange between a core switch and the forwarding switch. The method in this embodiment may include the following steps.

Step 1001. Receive a downstream packet sent by the core switch, where the downstream packet includes a source MAC address, and the source MAC address is used to indicate a downstream forwarding path of the downstream packet.

Step 1002. Determine, based on the source MAC address, an egress port corresponding to the downstream packet.

After receiving the downstream packet, the forwarding switch directly obtains the source MAC address by parsing the downstream packet, and searches for a non-zero byte starting from the least significant byte to a higher-order byte. In this case, an egress port indicated by a value of the first non-zero byte is a next-hop egress port. Then, the forwarding switch sets a bit used to indicate the egress port to zero.

Step 1003. Send the downstream packet through the egress port.

The forwarding switch may place the downstream packet into a forwarding queue corresponding to a priority of a terminal device that sends the downstream packet, and send the downstream packet through the next-hop egress port when it comes the turn to send the downstream packet.

In this embodiment, the core switch adds, to the downstream packet, the source MAC address that indicates the downstream forwarding path, so that the forwarding switch can forward the downstream packet based on the source MAC address, without requiring a label or storing an entry in a forwarding process, thereby reducing costs, improving efficiency, and simplifying network traffic.

Figure 13:
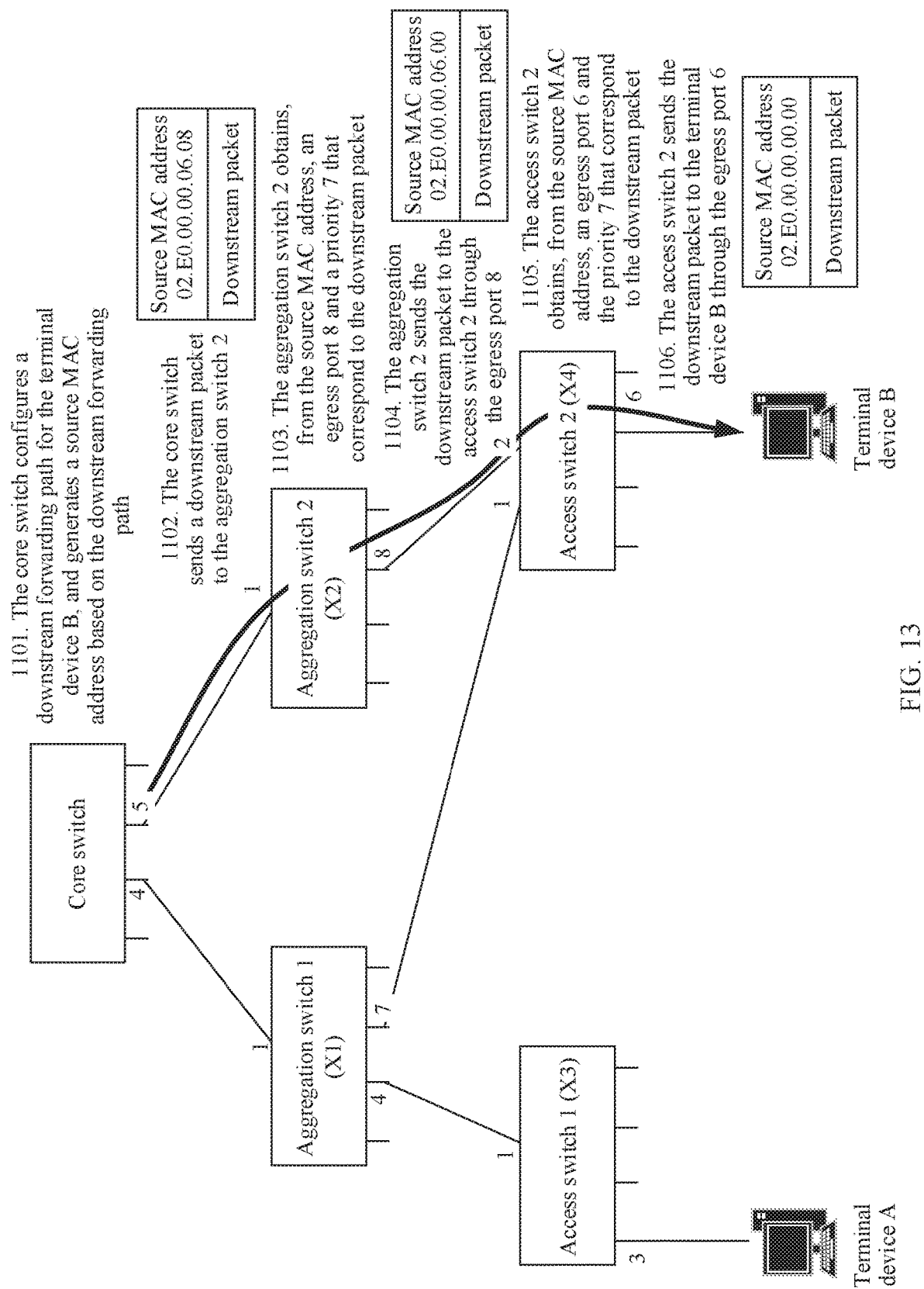
FIG. 13 is a flowchart of a downstream packet sending and forwarding method according to an embodiment of this application.

On a basis of the method embodiments shown in FIG. 11 and FIG. 12, FIG. 13 is a flowchart of a downstream packet sending and forwarding method according to an embodiment of this application. As shown in FIG. 13, the method in this embodiment may include the following steps.

Step 1101. A core switch configures a downstream forwarding path for a terminal device B, and generates a source MAC address based on the downstream forwarding path.

When the core switch needs to send a downstream packet to the terminal device B, the core switch first determines the downstream forwarding path, generates a source MAC address 02.E0.00.00.06.08 based on a downstream forwarding path labeled as "Active" in Table 1, and encapsulates the source MAC address into the downstream packet.

Step 1102. The core switch sends the downstream packet to an aggregation switch 2.

The core switch sends the downstream packet to the aggregation switch 2 through a Root egress port of the downstream forwarding path.

Step 1103. The aggregation switch 2 obtains, from the source MAC address, an egress port 8 and a priority 7 that correspond to the downstream packet.

After the downstream packet arrives at the aggregation switch 2, the aggregation switch 2 directly obtains the source MAC address 02.E0.00.00.06.08 by parsing the downstream packet, and searches for a non-zero byte starting from the least significant byte to a higher-order byte. In this case, the first non-zero byte is the least significant byte, and a value of the least significant byte represents that a next-hop egress port is 8. After determining the egress port 8, the aggregation switch 2 sets the first non-zero byte (the least significant byte) to zero. The aggregation switch 2 further learns, by parsing the 3 most significant bits in the second most significant byte, that a priority of the terminal device B is 7. Therefore, the aggregation switch 2 places the downstream packet into a forwarding queue whose priority is 7, and sends the downstream packet through the egress port 8 when it comes to the turn of the downstream packet.

Step 1104. The aggregation switch 2 sends the downstream packet to an access switch 2 through the egress port 8.

Step 1105. The access switch 2 obtains, from the source MAC address, an egress port 6 and a priority 7 that correspond to the downstream packet.

After the downstream packet arrives at the access switch 2, processing by the access switch 2 is similar to processing by the aggregation switch 2. To be specific, the access switch 2 directly obtains a source MAC address 02.E0.00.00.06.00 by parsing the downstream packet, and searches for a non-zero byte starting from the least significant byte to the higher-order byte. In this case, the first non-zero byte is the second least significant byte, and a value of the second least significant byte represents that a next-hop egress port is 6. After determining the egress port 6, the access switch 2 sets the first non-zero byte (the second least significant byte) to zero. The access switch 2 further learns, by parsing the 3 most significant bits in the second most significant byte, that a priority of the terminal device B is 7. Therefore, the access switch 2 places the downstream packet into a forwarding queue whose priority is 7, and sends the downstream packet through the egress port 6 when it comes to the turn of the downstream packet.

Step 1106. The access switch 2 sends the downstream packet to the terminal device B through the egress port 6.

In this embodiment, the terminal device adds, to the downstream packet, the source MAC address that indicates the downstream forwarding path, so that a forwarding switch can forward the downstream packet based on the source MAC address, without requiring a label or storing an entry in a forwarding process, thereby reducing costs, improving efficiency, and simplifying network traffic.

Similar to a case in upstream, a core switch may also redirect a downstream forwarding path for a terminal device. However, differences from upstream lie in that: In upstream, after reconfiguring an upstream forwarding path for the terminal device, the core switch needs to add a new destination MAC address to a gratuitous ARP packet and send the gratuitous ARP packet to the terminal device; while in downstream, the terminal device does not need to be specifically notified. When sending a downstream packet, the core switch directly encapsulates, into the downstream packet, a source MAC address generated based on a switched-to downstream forwarding path. In this way, in a process of forwarding the downstream packet, a forwarding switch along a route can learn of a next-hop egress port by obtaining the source MAC address by parsing the downstream packet.

Figure 14:
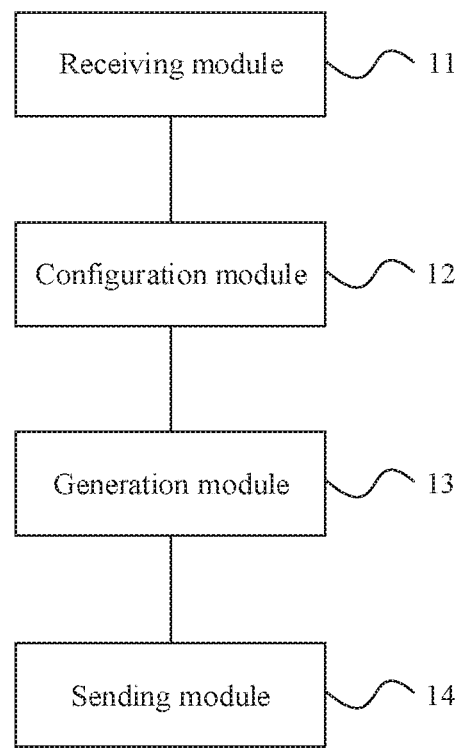
FIG. 14 is a schematic structural diagram of a routing information delivery apparatus according to an embodiment of this application.

FIG. 14 is a schematic structural diagram of a routing information delivery apparatus according to an embodiment of this application. As shown in FIG. 14, the apparatus in this embodiment may include a receiving module 11, a configuration module 12, a generation module 13, and a sending module 14. The receiving module 11 is configured to receive an ARP request sent by a terminal device. The configuration module 12 is configured to configure an upstream forwarding path of an upstream packet for the terminal device in response to the ARP request. The generation module 13 is configured to generate a destination MAC address based on the upstream forwarding path, where the destination MAC address is used to indicate the upstream forwarding path. The sending module 14 is configured to send an ARP response to the terminal device, where the ARP response includes the destination MAC address.

In a possible implementation, the configuration module 12 is further configured to determine a priority of the terminal device; and the address generation module is further configured to generate the destination MAC address based on the upstream forwarding path and the priority.

In a possible implementation, the configuration module 12 is further configured to: determine, based on a network topology and network traffic, whether the upstream forwarding path of the terminal device needs to be switched; and if the upstream forwarding path of the terminal device needs to be switched, configure a new upstream forwarding path for the terminal device based on the network topology and the network traffic, and generate a new destination MAC address based on the new upstream forwarding path.

In a possible implementation, the configuration module 12 is further configured to: determine whether the priority of the terminal device needs to be changed; and if the priority of the terminal device needs to be changed, determine a new priority of the terminal device, and generate a new destination MAC address based on the new priority.

In a possible implementation, the most significant byte in the destination MAC address is used to represent a type of the destination MAC address, the second most significant byte is used to represent the priority of the terminal device, and bytes from the least significant byte to a higher-order byte are used to respectively represent in sequence egress ports of forwarding switches on the upstream forwarding path of the upstream packet.

In a possible implementation, the sending module 14 is further configured to send a gratuitous ARP packet to the terminal device, where the gratuitous ARP packet includes the new destination MAC address.

The apparatus in this embodiment may be used to execute the related technical solutions of the method embodiment shown in FIG. 3, FIG. 5, FIG. 6, or FIG. 7. Their implementation principles and technical effects are similar, and are not further described herein.

Figure 15:
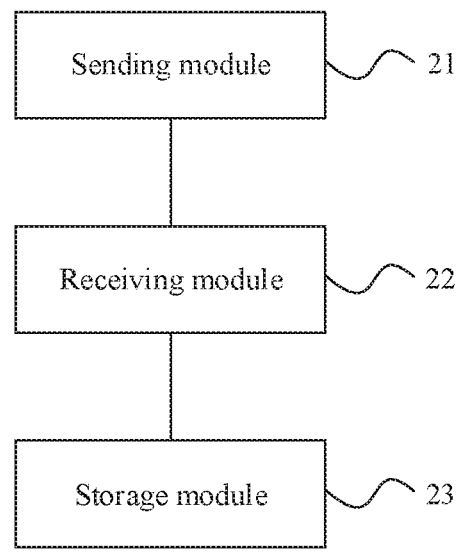
FIG. 15 is a schematic structural diagram of a routing information obtaining apparatus according to an embodiment of this application.

FIG. 15 is a schematic structural diagram of a routing information obtaining apparatus according to an embodiment of this application. As shown in FIG. 15, the apparatus in this embodiment may include a sending module 21, a receiving module 22, and a storage module 23. The sending module 21 is configured to send an ARP request to a core switch, where the ARP request is used to trigger the core switch to configure an upstream forwarding path of an upstream packet; and generate a destination MAC address based on the upstream forwarding path, where the destination MAC address is used to indicate the upstream forwarding path; The receiving module 22 is configured to receive an ARP response sent by the core switch, where the ARP response includes the destination MAC address. The storage module 23 is configured to store the destination MAC address in a locally stored ARP table.

In a possible implementation, the destination MAC address is further used to indicate a priority of a terminal device.

In a possible implementation, the most significant byte in the destination MAC address is used to represent a type of the destination MAC address, the second most significant byte is used to represent the priority of the terminal device, and bytes from the least significant byte to a higher-order byte are used to respectively represent in sequence egress ports of forwarding switches on the upstream forwarding path of the upstream packet.

In a possible implementation, the receiving module 22 is further configured to receive a gratuitous ARP packet sent by the core switch, where the gratuitous ARP packet includes a new destination MAC address, and the new destination MAC address includes a new upstream forwarding path and/or a new priority; and the storage module is further configured to update the ARP table based on the new destination MAC address.

The apparatus in this embodiment may be used to execute the related technical solutions of the method embodiment shown in FIG. 4, FIG. 5, FIG. 6, or FIG. 7. Their implementation principles and technical effects are similar, and are not further described herein.

Figure 16:
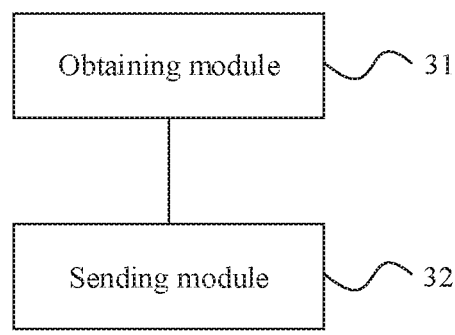
FIG. 16 is a schematic structural diagram of an upstream packet sending apparatus according to an embodiment of this application.

FIG. 16 is a schematic structural diagram of an upstream packet sending apparatus according to an embodiment of this application. As shown in FIG. 16, the apparatus in this embodiment may include an obtaining module 31 and a sending module 32. The obtaining module 31 is configured to obtain a destination MAC address based on a locally stored ARP table, where the destination MAC address is used to indicate an upstream forwarding path of an upstream packet; and the sending module 32 is configured to send the upstream packet to a forwarding switch, where the upstream packet includes the destination MAC address.

In a possible implementation, the destination MAC address is further used to indicate a priority of a terminal device.

In a possible implementation, the most significant byte in the destination MAC address is used to represent a type of the destination MAC address, the second most significant byte is used to represent the priority of the terminal device, and bytes from the least significant byte to a higher-order byte are used to respectively represent in sequence egress ports of forwarding switches on the upstream forwarding path of the upstream packet.

The apparatus in this embodiment may be used to execute the related technical solutions of the method embodiment shown in FIG. 8 or FIG. 10. The implementation principles and technical effects are similar, and are not further described herein.

Figure 17:
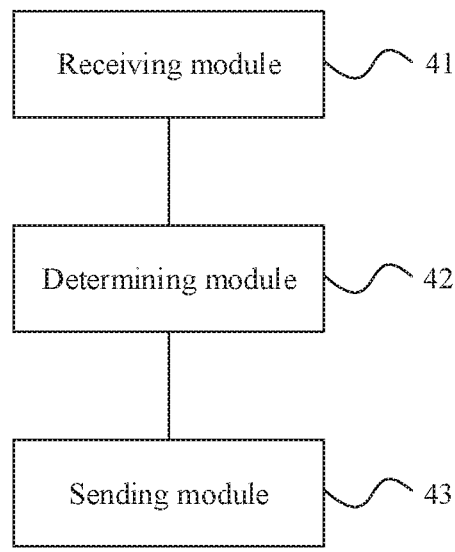
FIG. 17 is a schematic structural diagram of an upstream packet forwarding apparatus according to an embodiment of this application.

FIG. 17 is a schematic structural diagram of an upstream packet forwarding apparatus according to an embodiment of this application. As shown in FIG. 17, the apparatus in this embodiment may include a receiving module 41, a determining module 42, and a sending module 43. The receiving module 41 is configured to receive an upstream packet sent by a terminal device, where the upstream packet includes a destination MAC address, and the destination MAC address is used to indicate an upstream forwarding path of the upstream packet. The determining module 42 is configured to determine, based on the destination MAC address, an egress port corresponding to the upstream packet. The sending module 43 is configured to send the upstream packet through the egress port.

In a possible implementation, the destination MAC address is further used to indicate a priority of the terminal device; and the sending module is specifically configured to place the upstream packet into a forwarding queue corresponding to the priority, and send the upstream packet through the egress port when it comes the turn to send the upstream packet.

In a possible implementation, the determining module 42 is further configured to set a bit that is in the destination MAC address and that is used to represent the egress port to zero.

In a possible implementation, the determining module 42 is specifically configured to search for a non-zero byte starting from the least significant byte to a higher-order byte of the destination MAC address, and use, as the egress port, an egress port indicated by a value of the first non-zero byte.

In a possible implementation, the most significant byte in the destination MAC address is used to represent a type of the destination MAC address, the second most significant byte is used to represent the priority of the terminal device, and bytes from the least significant byte to a higher-order byte are used to respectively represent in sequence egress ports of forwarding switches on the upstream forwarding path of the upstream packet.

The apparatus in this embodiment may be used to execute the related technical solutions of the method embodiment shown in FIG. 9 or FIG. 10. The implementation principles and technical effects are similar, and are not further described herein.

Figure 18:
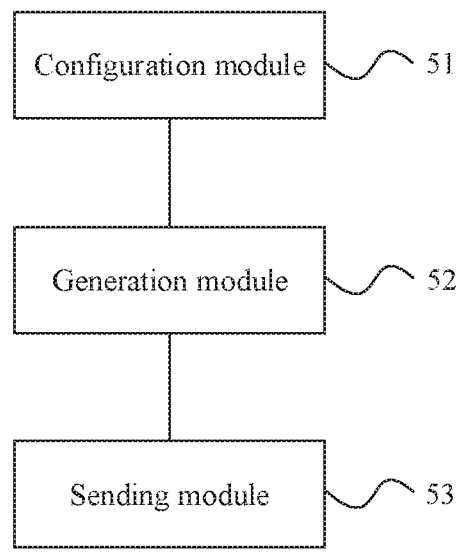
FIG. 18 is a schematic structural diagram of a downstream packet sending apparatus according to an embodiment of this application.

FIG. 18 is a schematic structural diagram of a downstream packet sending apparatus according to an embodiment of this application. As shown in FIG. 18, the apparatus in this embodiment may include a configuration module 51, a generation module 52, and a sending module 53. The configuration module 51 is configured to configure a downstream forwarding path of a downstream packet for a terminal device. The generation module 52 is configured to generate a source MAC address based on the downstream forwarding path, where the source MAC address is used to indicate the downstream forwarding path. The sending module 53 is configured to send the downstream packet to a forwarding switch, where the downstream packet includes the source MAC address.

In a possible implementation, the configuration module 51 is further configured to determine a priority of the terminal device; and the generation module 52 is configured to generate the source MAC address based on the downstream forwarding path and the priority.

In a possible implementation, the configuration module 51 is further configured to determine, based on a network topology and network traffic, whether the downstream forwarding path of the terminal device needs to be switched and/or whether the priority of the terminal device needs to be changed; if the downstream forwarding path of the terminal device needs to be switched and/or the priority of the terminal device needs to be changed, configure a new downstream forwarding path and/or a new priority for the terminal device based on the network topology and the network traffic; and The generating module 52 is further configured to generate a new source MAC address based on the new downstream forwarding path and/or the new priority.

In a possible implementation, the most significant byte in the source MAC address is used to represent a type of the source MAC address, the second most significant byte is used to represent the priority of the terminal device, and bytes from the least significant byte to a higher-order byte are used to respectively represent in sequence egress ports of forwarding switches on the downstream forwarding path of the downstream packet.

The apparatus in this embodiment may be used to execute the related technical solutions of the method embodiment shown in FIG. 11 or FIG. 13. The implementation principles and technical effects are similar, and are not further described herein.

Figure 19:
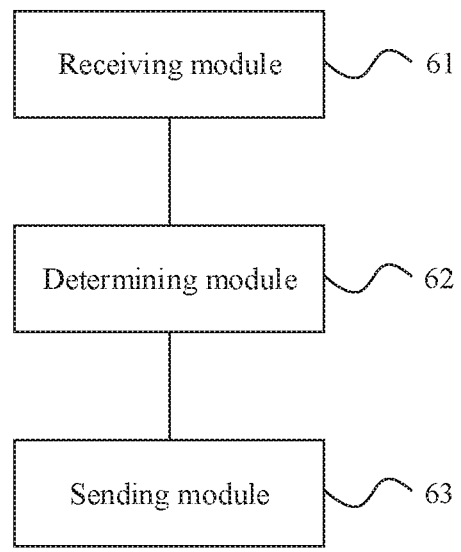
FIG. 19 is a schematic structural diagram of a downstream packet forwarding apparatus according to an embodiment of this application.

FIG. 19 is a schematic structural diagram of a downstream packet forwarding apparatus according to an embodiment of this application. As shown in FIG. 19, the apparatus in this embodiment may include a receiving module 61, a determining module 62, and a sending module 63. The receiving module 61 is configured to receive a downstream packet that is sent by a core switch to a terminal device, where the downstream packet includes a source MAC address, and the source MAC address is used to indicate a downstream forwarding path of the downstream packet. The determining module 62 is configured to determine, based on the source MAC address, an egress port corresponding to the downstream packet. The sending module 63 is configured to send the downstream packet through the egress port.

In a possible implementation, the source MAC address is further used to indicate a priority of the terminal device; and the sending module 63 is specifically configured to place the downstream packet into a forwarding queue corresponding to the priority, and send the downstream packet through the egress port when it comes the turn to send the downstream packet.

In a possible implementation, the determining module 62 is further configured to set a bit that is in the source MAC address and that is used to represent the egress port to zero.

In a possible implementation, the determining module 62 is specifically configured to search for a non-zero byte starting from the least significant byte to a higher-order byte of the source MAC address, and use, as the egress port, an egress port indicated by a value of the first non-zero byte.

In a possible implementation, the most significant byte in the source MAC address is used to represent a type of the source MAC address, the second most significant byte is used to represent the priority of the terminal device, and bytes from the least significant byte to a higher-order byte are used to respectively represent in sequence egress ports of forwarding switches on the downstream forwarding path of the downstream packet.

The apparatus in this embodiment may be used to execute the related technical solutions of the method embodiment shown in FIG. 12 or FIG. 13. The implementation principles and technical effects are similar, and are not further described herein.

Figure 20:
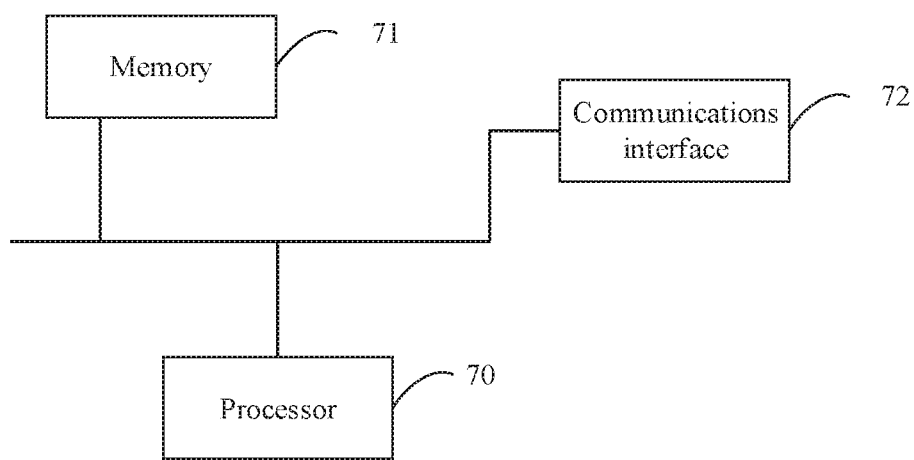
FIG. 20 is a schematic structural diagram of a device according to an embodiment of this application.

FIG. 20 is a schematic structural diagram of a device according to an embodiment of this application. As shown in FIG. 20, the device includes a processor 70, a memory 71, and a communications interface 72. There may be one or more processors 70 in the device. In FIG. 20, one processor 70 is used as an example. The processor 70, the memory 71, and the communications interface 72 in the device may be connected by using a bus or in another manner. In FIG. 20, for example, the processor 70, the memory 71, and the communications interface 72 are connected by using a bus.

As a computer-readable storage medium, the memory 71 may be configured to store a software program, a computer-executable program, and a module, for example, a program instruction/module corresponding to the method in the embodiments of this application. The processor 70 runs the software program, the instruction, and the module that are stored in the memory 71, to execute various function applications and data processing of the device, that is, implement the foregoing methods.

The memory 71 may mainly include a program storage area and a data storage area, where the program storage area may store an operating system, and an application program required by at least one function; and the data storage area may store data and the like created according to use of the terminal. In addition, the memory 71 may include a high speed random access memory, and may further include a nonvolatile memory, for example, at least one magnetic disk storage device, a flash storage device, or another volatile solid-state storage device. In some examples, the memory 71 may further include memories that are remotely disposed relative to the processor 70, and the remote memories may be connected to the device over a network. An example of the network includes but is not limited to an Internet, an enterprise internal network, a local network, a mobile communications network, and a combination thereof.

The communications interface 72 may be configured to: receive or send data, and generate a signal input and a signal output related to user setting and function control of the device.

In a possible implementation, the device may be a core switch.

In a possible implementation, the device may be an aggregation switch or an access switch.

In a possible implementation, the device may be a terminal device, for example, may be user equipment.

In a possible implementation, this application provides a computer-readable storage medium. The computer-readable storage medium stores an instruction. When the instruction is run on a computer, the instruction is used to perform the technical solution in the method embodiment shown in any one of FIG. 3 to FIG. 13.

In a possible implementation, this application provides a computer program product including an instruction. When the computer program product runs on a computer, the computer program product is configured to perform the technical solution in the method embodiment shown in any one of FIG. 3 to FIG. 13.

It may be understood that all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A downstream packet sending method, comprising:
    configuring a downstream forwarding path of a downstream packet for a terminal device;
    generating a source medium access control (MAC) address based on the downstream forwarding path, wherein the source MAC address indicates the downstream forwarding path, wherein a most significant byte in the source MAC address represents a type of the source MAC address, a second most significant byte represents a priority of the terminal device; and
    sending the downstream packet to a forwarding switch, wherein the downstream packet comprises the source MAC address.

2. The method according to claim 1, wherein before the generating the source MAC address based on the downstream forwarding path, the method further comprises:
    determining the priority of the terminal device; and
    wherein the generating the source MAC address based on the downstream forwarding path comprises:
    generating the source MAC address based on the downstream forwarding path and the priority.

3. The method according to claim 2, wherein after the sending the downstream packet to the forwarding switch, the method further comprises:
    determining, based on a network topology and network traffic, whether the downstream forwarding path of the terminal device needs to be switched or whether the priority of the terminal device needs to be changed;
    in response to determining that the downstream forwarding path of the terminal device needs to be switched or the priority of the terminal device needs to be changed, configuring a new downstream forwarding path or a new priority for the terminal device based on the network topology and the network traffic; and
    generating a new source MAC address based on the new downstream forwarding path or the new priority.

4. The method according to claim 3, wherein bytes from a least significant byte to a higher-order byte respectively represent in sequence egress ports of forwarding switches on the downstream forwarding path of the downstream packet.

5. The method according to claim 1, wherein an egress port that is used to send the downstream packet is indicated by a value of a first non-zero byte starting from a least significant byte of the source MAC address.

6. A downstream packet forwarding method, comprising:
    receiving a downstream packet sent by a core switch, wherein the downstream packet comprises a source medium access control (MAC) address, wherein the source MAC address indicates a downstream forwarding path of the downstream packet, and the source MAC address further indicates a priority of a terminal device;
    determining, based on the source MAC address, an egress port corresponding to the downstream packet; and
    sending the downstream packet through the egress port, wherein the sending the downstream packet through the egress port comprises:
    placing the downstream packet into a forwarding queue corresponding to the priority; and
    sending the downstream packet through the egress port according to the forwarding queue.

7. The method according to claim 6, wherein after the determining, based on the source MAC address, the egress port corresponding to the downstream packet, the method further comprises:
    setting a bit in the source MAC address to zero, wherein the bit represents the egress port.

8. The method according to claim 7, wherein the determining, based on the source MAC address, the egress port corresponding to the downstream packet comprises:
    searching for a non-zero byte starting from a least significant byte to a higher-order byte of the source MAC address, and wherein the egress port that is used to send the downstream packet is indicated by a value of a first non-zero byte.

9. The method according to claim 8, wherein a most significant byte in the source MAC address represents a type of the source MAC address, a second most significant byte represents the priority of the terminal device, and bytes from the least significant byte to the higher-order byte respectively represent in sequence egress ports of forwarding switches on the downstream forwarding path of the downstream packet.

10. A downstream packet sending apparatus, comprising:
    a non-transitory memory storage comprising instructions; and
    one or more hardware processors in communication with the non-transitory memory storage, wherein the one or more hardware processors execute the instructions to:
    configure a downstream forwarding path of a downstream packet for a terminal device;
    generate a source medium access control (MAC) address based on the downstream forwarding path, wherein the source MAC address indicates the downstream forwarding path, wherein a most significant byte in the source MAC address represents a type of the source MAC address, a second most significant byte represents a priority of the terminal device; and
    send the downstream packet to a forwarding switch, wherein the downstream packet comprises the source MAC address.

11. The apparatus according to claim 10, wherein the one or more hardware processors execute the instructions to:
    determine the priority of the terminal device; and
    generate the source MAC address based on the downstream forwarding path and the priority.

12. The apparatus according to claim 11, wherein the one or more hardware processors execute the instructions to:
    determine, based on a network topology and network traffic, whether the downstream forwarding path of the terminal device needs to be switched or whether the priority of the terminal device needs to be changed;
    in response to determining that the downstream forwarding path of the terminal device needs to be switched or the priority of the terminal device needs to be changed, configure a new downstream forwarding path or a new priority for the terminal device based on the network topology and the network traffic; and generate a new source MAC address based on the new downstream forwarding path or the new priority.

13. The apparatus according to claim 12, wherein bytes from a least significant byte to a higher-order byte respectively represent in sequence egress ports of forwarding switches on the downstream forwarding path of the downstream packet.

14. The apparatus according to claim 10, wherein an egress port that is used to send the downstream packet is indicated by a value of a first non-zero byte starting from a least significant byte of the source MAC address.

15. A downstream packet forwarding apparatus, comprising:

a non-transitory memory storage comprising instructions; and one or more hardware processors in communication with the non-transitory memory storage, wherein the one or more hardware processors execute the instructions to:

receive a downstream packet sent by a core switch, wherein the downstream packet comprises a source medium access control (MAC) address, wherein the source MAC address indicates a downstream forwarding path of the downstream packet, and the source MAC address further indicates a priority of a terminal device;

determine, based on the source MAC address, an egress port corresponding to the downstream packet; and send the downstream packet through the egress port, wherein send the downstream packet through the egress port comprises:

place the downstream packet into a forwarding queue corresponding to the priority; and send the downstream packet through the egress port according to the forwarding queue.

16. The apparatus according to claim 15, wherein the one or more hardware processors execute the instructions to set a bit in the source MAC address to zero, wherein the bit represents the egress port.

17. The apparatus according to claim 16, wherein the one or more hardware processors execute the instructions to search for a non-zero byte starting from a least significant byte to a higher-order byte of the source MAC address, and wherein the egress port that is used to send the downstream packet is indicated by a value of a first non-zero byte.

18. The apparatus according to claim 17, wherein a most significant byte in the source MAC address represents a type of the source MAC address, a second most significant byte represents the priority of the terminal device, and bytes from the least significant byte to the higher-order byte respectively represent in sequence egress ports of forwarding switches on the downstream forwarding path of the downstream packet.

* * * * *